United States Patent
Takeshita et al.

(10) Patent No.: US 9,034,515 B2
(45) Date of Patent: May 19, 2015

(54) BATTERY DEVICE AND ELECTRONIC APPARATUS

(71) Applicant: SONY CORPORATION, Tokyo (JP)

(72) Inventors: Toshio Takeshita, Kanagawa (JP); Kei Tashiro, Kanagawa (JP); Takashi Kondou, Aichi (JP); Yoshihito Tamesue, Aichi (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/328,969

(22) Filed: Jul. 11, 2014

(65) Prior Publication Data

US 2014/0322593 A1    Oct. 30, 2014

Related U.S. Application Data

(63) Continuation of application No. 14/046,453, filed on Oct. 4, 2013, now Pat. No. 8,802,280, which is a continuation of application No. 13/839,580, filed on Mar. 15, 2013, now Pat. No. 8,617,741, which is a (Continued)

(30) Foreign Application Priority Data

Dec. 26, 2003  (JP) ................................. 2003-433927

(51) Int. Cl.
*H01M 2/02*    (2006.01)
*H02J 7/00*    (2006.01)
(Continued)

(52) U.S. Cl.
CPC .......... *H01M 2/1055* (2013.01); *H01M 2/1066* (2013.01); *H01M 2/30* (2013.01); *H01M 10/42* (2013.01); *H01M 10/46* (2013.01); *H01M 2220/30* (2013.01)

(58) Field of Classification Search
USPC .......................................... 429/179; 320/106
See application file for complete search history.

(56) References Cited

U.S. PATENT DOCUMENTS 4,184,277 A    1/1980  Larin
4,301,946 A    11/1981 Goldin et al.
(Continued)

FOREIGN PATENT DOCUMENTS

DE    19921356 B4    1/2005
EP    0 572 327 A1   12/1993
(Continued)

OTHER PUBLICATIONS

Extended European Search Report Issued Nov. 3, 2008 in Patent Application No. 08002683.4.

(Continued)

*Primary Examiner* — M'Baye Diao
(74) *Attorney, Agent, or Firm* — Oblon, McClelland, Maier & Neustadt, L.L.P.

(57) ABSTRACT

A battery charger includes a battery attachment section configured to have a rechargeable battery releasably attached thereto. The battery attachment section includes a flat attachment surface having a width corresponding to a width of a bottom surface of a case of the battery to be charged and a length greater than a length of the bottom surface of the case of the battery to be charged; a plurality of locking hooks provided on the attachment surface; a charger terminal configured to contact a terminal of the battery to be charged, the charger terminal including a plurality of plate-shaped contact pieces configured to be inserted into engaging grooves of the battery to be charged; and an attachment projection adjacent to the attachment surface and configured to secure the battery to the charger.

24 Claims, 17 Drawing Sheets

Related U.S. Application Data continuation of application No. 13/481,359, filed on May 25, 2012, now Pat. No. 8,461,799, which is a continuation of application No. 13/240,973, filed on Sep. 22, 2011, now Pat. No. 8,432,127, which is a continuation of application No. 12/845,437, filed on Jul. 28, 2010, now Pat. No. 8,048,553, which is a continuation of application No. 11/858,654, filed on Sep. 20, 2007, now Pat. No. 7,794,867, which is a continuation of application No. 10/550,535, filed as application No. PCT/JP2004/019780 on Dec. 24, 2004, now Pat. No. 7,306,878.

(51) Int. Cl.
  *H01M 2/10* (2006.01)
  *H01M 2/30* (2006.01)
  *H01M 10/42* (2006.01)
  *H01M 10/46* (2006.01)

(56) References Cited

U.S. PATENT DOCUMENTS

| | | | |
|---|---|---|---|
| 4,494,854 | A | 1/1985 | Yamaga et al. |
| 4,578,628 | A | 3/1986 | Siwiak |
| 4,943,498 | A | 7/1990 | Cooper et al. |
| 5,049,091 | A | 9/1991 | Tanaka |
| 5,091,832 | A | 2/1992 | Tortola et al. |
| 5,130,907 | A | 7/1992 | Tortola et al. |
| 5,180,644 | A | 1/1993 | Bresin et al. |
| 5,302,887 | A | 4/1994 | Ishiguro et al. |
| 5,415,947 | A | 5/1995 | Mitsui et al. |
| 5,434,018 | A | 7/1995 | Sasaki et al. |
| 5,436,088 | A | 7/1995 | Castaneda et al. |
| D362,424 | S | 9/1995 | Sumita et al. |
| 5,505,202 | A | 4/1996 | Mogi et al. |
| 5,506,749 | A * | 4/1996 | Matsuda .................. 361/679.58 |
| 5,510,205 | A | 4/1996 | Ozer |
| 5,563,005 | A | 10/1996 | Ohtani et al. |
| 5,602,454 | A | 2/1997 | Arakawa et al. |
| 5,626,979 | A | 5/1997 | Mitsui et al. |
| 5,672,441 | A | 9/1997 | Aoki et al. |
| 5,738,954 | A | 4/1998 | Latella et al. |
| 5,824,431 | A | 10/1998 | Tsurumaru et al. |
| D417,861 | S | 12/1999 | Maeyama |
| 6,018,227 | A | 1/2000 | Kumar et al. |
| 6,051,334 | A | 4/2000 | Tsurumaru et al. |
| D425,479 | S | 5/2000 | Melnicoff |
| 6,057,608 | A | 5/2000 | Bailey, Jr. et al. |
| 6,068,946 | A | 5/2000 | Zedell, Jr. et al. |
| 6,075,341 | A | 6/2000 | White et al. |
| 6,091,224 | A | 7/2000 | Morita |
| 6,127,063 | A | 10/2000 | Kowalsky et al. |
| 6,146,210 | A | 11/2000 | Cha et al. |
| 6,154,004 | A | 11/2000 | Higuchi |
| 6,171,126 | B1 | 1/2001 | Wu et al. |
| 6,261,715 | B1 | 7/2001 | Nakamura et al. |
| D447,122 | S | 8/2001 | Harasawa et al. |
| 6,521,370 | B1 | 2/2003 | Takeshita et al. |
| D473,186 | S | 4/2003 | Grosfeld et al. |
| D473,192 | S | 4/2003 | Ouchi et al. |
| 6,568,962 | B2 | 5/2003 | Nakamura et al. |
| 6,677,078 | B2 | 1/2004 | Reise et al. |
| 6,729,413 | B2 | 5/2004 | Turner et al. |
| 6,783,886 | B1 * | 8/2004 | Sakakibara et al. ............ 429/99 |
| 6,911,802 | B2 * | 6/2005 | Takeshita et al. ............ 320/107 |
| D515,499 | S | 2/2006 | Matsuda et al. |
| D535,253 | S | 1/2007 | Buck |
| 7,485,394 | B2 | 2/2009 | Takeshita et al. |
| 7,781,096 | B2 | 8/2010 | Takahashi et al. |
| 7,794,867 | B2 | 9/2010 | Takeshita et al. |
| 2002/0012831 | A1 | 1/2002 | Takeshita et al. |
| 2002/0034683 | A1 | 3/2002 | Takeshita et al. |
| 2003/0210225 | A1 | 11/2003 | Miyashita et al. |
| 2004/0058231 | A1 | 3/2004 | Takeshita et al. |
| 2004/0152365 | A1 | 8/2004 | Ebine |
| 2005/0112415 | A1 | 5/2005 | Takeshita et al. |
| 2005/0202315 | A1 | 9/2005 | Sugeno et al. |
| 2006/0068280 | A1 | 3/2006 | Takeshita et al. |
| 2007/0037044 | A1 | 2/2007 | Sato et al. |
| 2007/0042232 | A1 | 2/2007 | Takeshita et al. |
| 2007/0054180 | A1 | 3/2007 | Miyajima et al. |
| 2008/0050648 | A1 | 2/2008 | Hara et al. |
| 2008/0050650 | A1 | 2/2008 | Hara et al. |
| 2008/0096100 | A1 | 4/2008 | Hagiwara et al. |
| 2008/0280200 | A1 | 11/2008 | Takahashi et al. |
| 2010/0003585 | A1 | 1/2010 | Takahashi et al. |
| 2010/0045242 | A1 | 2/2010 | Nagashima et al. |

FOREIGN PATENT DOCUMENTS

| | | |
|---|---|---|
| EP | 0 588 728 A | 3/1994 |
| EP | 0 588 728 A1 | 3/1994 |
| EP | 0 676 819 A | 10/1995 |
| EP | 0 676 819 A2 | 10/1995 |
| EP | 0694980 B1 | 1/1998 |
| EP | 0617486 B1 | 6/1998 |
| EP | 1 030 385 A1 | 8/2000 |
| EP | 1 030 386 A1 | 8/2000 |
| EP | 1411565 A1 | 4/2004 |
| EP | 1 699 096 A | 9/2006 |
| GB | 2317062 A | 3/1998 |
| JP | 62-140669 | 9/1987 |
| JP | 1-155654 | 10/1989 |
| JP | 55-93686 | 7/1990 |
| JP | 4-10957 | 1/1992 |
| JP | H5-205712 | 8/1993 |
| JP | 06-104017 | 4/1994 |
| JP | 07-113855 | 5/1995 |
| JP | 07-312212 | 11/1995 |
| JP | H09-27306 | 1/1997 |
| JP | 11-297282 | 10/1999 |
| JP | 2000-243361 | 9/2000 |
| JP | 2001-43840 | 2/2001 |
| JP | 2001-307703 | 11/2001 |
| JP | 2002-63876 | 2/2002 |
| JP | 2003-036828 | 2/2003 |
| JP | 2003-77443 | 3/2003 |
| WO | WO 98/45907 | 10/1998 |

OTHER PUBLICATIONS

U.S. Office Action mailed Sep. 29, 2009 in U.S. Appl. No. 11/858,654.
Extended European Search Report Issued Nov. 17, 2009 in Patent Application No. 04808130.1.
U.S. Office Action mailed Mar. 24, 2011 in U.S. Appl. No. 12/845,443.
U.S. Office Action mailed Mar. 24, 2011 in U.S. Appl. No. 12/845,437.
U.S. Office Action mailed Jan. 23, 2012 in co-pending U.S. Appl. No. 13/240,973.
European Search Report issued Mar. 12, 2014, in Patent Application No. 11171626.2.
European Search Report issued Mar. 24, 2014, in Patent Application No. 13185940.7.
European Search Report issued Apr. 7, 2014, in Patent Application No. 13185959.7.
European Office Communication including European Search Report issued Apr. 30, 2014, in Patent Application No. 11171633.8.
Extended European Search Report issued Apr. 30, 2014 in Patent Application No. 11171633.8.
Extended European Search Report issued Sep. 23, 2014 in Patent Application No. 12173409.9.

* cited by examiner

BATTERY DEVICE AND ELECTRONIC APPARATUS

CROSS-REFERENCE TO RELATED APPLICATIONS

This application is a continuation of U.S. application Ser. No. 14/046,453, filed Oct. 4, 2013, which is a continuation of U.S. application Ser. No. 13/839,580, filed Mar. 15, 2013, now U.S. Pat. No. 8,617,741, which is a continuation of U.S. application Ser. No. 13/481,359, filed May 25, 2012, now U.S. Pat. No. 8,461,799, which is a continuation of U.S. application Ser. No. 13/240,973, filed Sep. 22, 2011, now U.S. Pat. No. 8,432,127, which is a continuation of U.S. application Ser. No. 12/845,437, filed Jul. 28, 2010, now U.S. Pat. No. 8,048,553, which is a continuation of U.S. application Ser. No. 11/858,654, filed Sep. 20, 2007, now U.S. Pat. No. 7,794,867, which is a continuation of U.S. application Ser. No. 10/550,535, filed Sep. 20, 2006, now U.S. Pat. No. 7,306,878, the entire contents of each of which is incorporated herein by reference. U.S. application Ser. No. 10/550,535 is a National Stage of PCT/JP2004/019780, filed Dec. 24, 2004, which is based upon and claims the benefit of priority from prior Japanese Patent Application No. 2003-433927, filed Dec. 26, 2003.

TECHNICAL FIELD

The present invention relates to a battery apparatus, and electronic equipment which operates by the battery apparatus.

BACKGROUND ART

There have been provided a battery apparatus, and electronic equipment which has a battery attachment section to which the battery apparatus is attached, and operates by power supplied from the battery apparatus (see, e.g., Japanese Patent Publication No. 2508447).

If the electronic equipment is to be used by attaching the battery apparatus thereto, it is required that a battery apparatus having a capacity suitable for a current to be consumed by the electronic equipment be attached to the electronic equipment. Therefore, it is preferable to permit attachment of only a battery apparatus having a suitable capacity, to the battery attachment section, and not to permit attachment of a battery apparatus not having a suitable capacity.

Thus, conventionally, e.g., around the middle of an attachment surface of the battery attachment section of the electronic equipment, a projection (recess) is provided which projects outward from the attachment surface, and in a bottom surface of the battery apparatus which faces the above-mentioned attachment surface, a recess (projection) is also provided so as to be hollowed out from the bottom surface of the battery apparatus. And it is configured such that only when the projection and the recess match, attachment of the battery apparatus to the attachment section is permitted, and such that when they do not match, attachment of the battery apparatus to the battery attachment section is prohibited (see, e.g., Japanese Patent Publication No. 3427900).

Further, a battery charger as electronic equipment for charging the battery apparatus needs to set proper charging current values for supply to a plurality of types of battery apparatus, each having a different characteristic (capacity, suitable charging current, or the like). Thus, e.g., a switch for switching charging current values is provided on the battery charger, and a user operates the switch according to the battery apparatus.

However, if the recess is provided around the middle of the attachment surface or the bottom surface of the battery apparatus or the electronic equipment, due to the fact that substrates and electronic components are disposed around the middle of the attachment surface and the bottom surface, the size of the battery apparatus or the electronic equipment must be increased, depending on the depth of the recess, and this configuration has been disadvantageous in miniaturizing the battery apparatus and the electronic equipment.

Further, in the case where the switch for switching charging currents is provided on the battery charger, the user must operate the switch for each different characteristic of the battery apparatus, and this configuration has been disadvantageous in improving their operability. The present invention has been made in view of such circumstances, and an object thereof is to provide a battery apparatus and electronic equipment, in which the battery apparatus having a characteristic compatible with the electronic equipment can be suitably attached to the electronic equipment, and which are advantageous in miniaturizing themselves and improving their operability.

Further, another object of the present invention is to provide electronic equipment which can operate suitably according to a characteristic of a battery apparatus, and which is advantageous in enhancing its usability.

DISCLOSURE OF THE INVENTION

To achieve the above-mentioned objects, a battery apparatus of the present invention is characterized as follows. The battery apparatus includes: a case having a width, a thickness, and a length; a battery cell accommodated inside the case; and a battery-side terminal provided on an end surface which is positioned at one of ends of the case in a length direction and which is electrically connected to the battery cell. A bottom surface positioned on one side of the case in a thickness direction is aligned with an attachment surface of a battery attachment section of electronic equipment to attach the battery apparatus by sliding the case along the length direction thereof, and the battery-side terminal comes in contact with an attachment section-side terminal of the battery attachment section. The battery-side terminal is provided on the end surface, and an identification section for identifying a characteristic of the battery apparatus is provided at a location which is on the end surface and which is on a side of the battery-side terminal in the width direction. The identification section is configured with an identification recess formed in a manner open to the end surface, and at least one of a position, a cross-sectional shape, and a length of the identification recess is formed on the basis of the characteristic of the battery apparatus.

Further, electronic equipment of the present invention is electronic equipment having a battery attachment section to which a battery apparatus is releasably attached, and is characterized as follows. The battery apparatus includes a case having a width, a thickness, and a length; a battery cell accommodated inside the case, and a battery-side terminal provided on an end surface which is positioned at one of ends of the case in a length direction and which is electrically connected to the battery cell. The battery-side terminal is provided on the end surface, and an identification section for identifying a characteristic of the battery apparatus is provided at a location which is on the end surface and which is on a side of the battery-side terminal in the width direction. The identification section is configured with an identification recess formed in a manner open to the end surface, and at least one of a position, a cross-sectional shape, and a length of the identification recess is formed on the basis of the characteristic of the battery apparatus. The battery attachment section is provided with an attachment section-side terminal which connects to the battery-side terminal in a state in which a bottom surface positioned at one end of the case in a thickness direction is aligned with an attachment surface of the battery attachment section to attach the battery apparatus by sliding the case along the length direction thereof, and an identification projection which is inserted into the identification recess of the battery apparatus having the characteristic usable for the electronic equipment.

Furthermore, electronic equipment of the present invention is electronic equipment having a battery attachment section to which a battery apparatus is releasably attached, and is characterized as follows. The battery apparatus includes a case having a width, a thickness, and a length; a battery cell provided inside the case; and a battery-side terminal provided on an end surface which is positioned at one of ends of the case in a length direction and which is connected to the battery cell. The battery-side terminal is provided on the end surface, and an identification section for identifying a characteristic of the battery apparatus is provided at a location which is on the end surface and which is on a side of the battery-side terminal in the width direction. The identification section is configured with an identification recess formed in a manner open to the end surface, and at least one of a position, a cross-sectional shape, and a length of the identification recess is formed on the basis of the characteristic of the battery apparatus. The battery attachment section is provided with an attachment section-side terminal which connects to the battery-side terminal in a state in which the battery apparatus attached to the battery attachment section, and detection means for detecting at least one of the position, the cross-sectional shape, and the length of the identification recess of the battery apparatus, wherein the characteristic of the battery apparatus is determined on the basis of a detection result by the detection means.

As a result, according to the battery apparatus and the electronic equipment of the present invention, attachment of the battery apparatus having a characteristic usable for the electronic equipment, to the battery attachment section is permitted by the identification projection being inserted into the identification recess. On the other hand, the identification recess of the battery apparatus not having a characteristic usable for the electronic equipment does not have the identification projection inserted thereinto, and thus, attachment of the battery apparatus not having the characteristic usable for the electronic equipment, to the battery attachment section is prohibited by the identification projection not being inserted into the identification recess. As a result, the battery apparatus having the characteristic compatible with the electronic equipment can be attached suitably.

Further, in the battery apparatus, portions which are inside of an end surface at one end of the case in the length direction and which are on both sides of the battery-side terminal in the width direction are left as a dead space where neither boards nor electronic components are disposed. Thus, even if the identification recess is provided in the end surface of the case, the size of the case is not increased. Therefore, this configuration is not a hindrance to miniaturizing the battery apparatus.

Furthermore, according to the battery apparatus of the present invention, when the battery apparatus has been attached to the battery attachment section of the electronic equipment, at least one of the position, cross-sectional shape, and length of the identification recess of the battery apparatus is detected by the detection means, whereby a suitable charging operation compatible with the characteristic of the battery apparatus can be performed on the basis of this detection result. Therefore, this configuration is advantageous in enhancing the usability of the electronic equipment.

BEST MODES FOR CARRYING OUT THE INVENTION

The object of permitting suitable attachment of a battery apparatus having a characteristic compatible with electronic equipment, and miniaturizing them and improving their operability is realized by providing identification recesses as an identification section in side portions of a battery-side terminal of the battery apparatus, and also providing identification recesses in the electronic equipment.

Further, the object of enhancing the usability of the electronic equipment is realized by providing detection means for determining the characteristic of the battery apparatus on the basis of at least the position, cross-sectional shape, and the length of each identification recess of the battery apparatus.

Embodiment 1

Next, Embodiment 1 of the present invention will be described with reference to the drawings.

In the present embodiment, a case will be described, where a battery apparatus of the present invention is used while attached to an imaging apparatus as electronic equipment.

Figure 1:
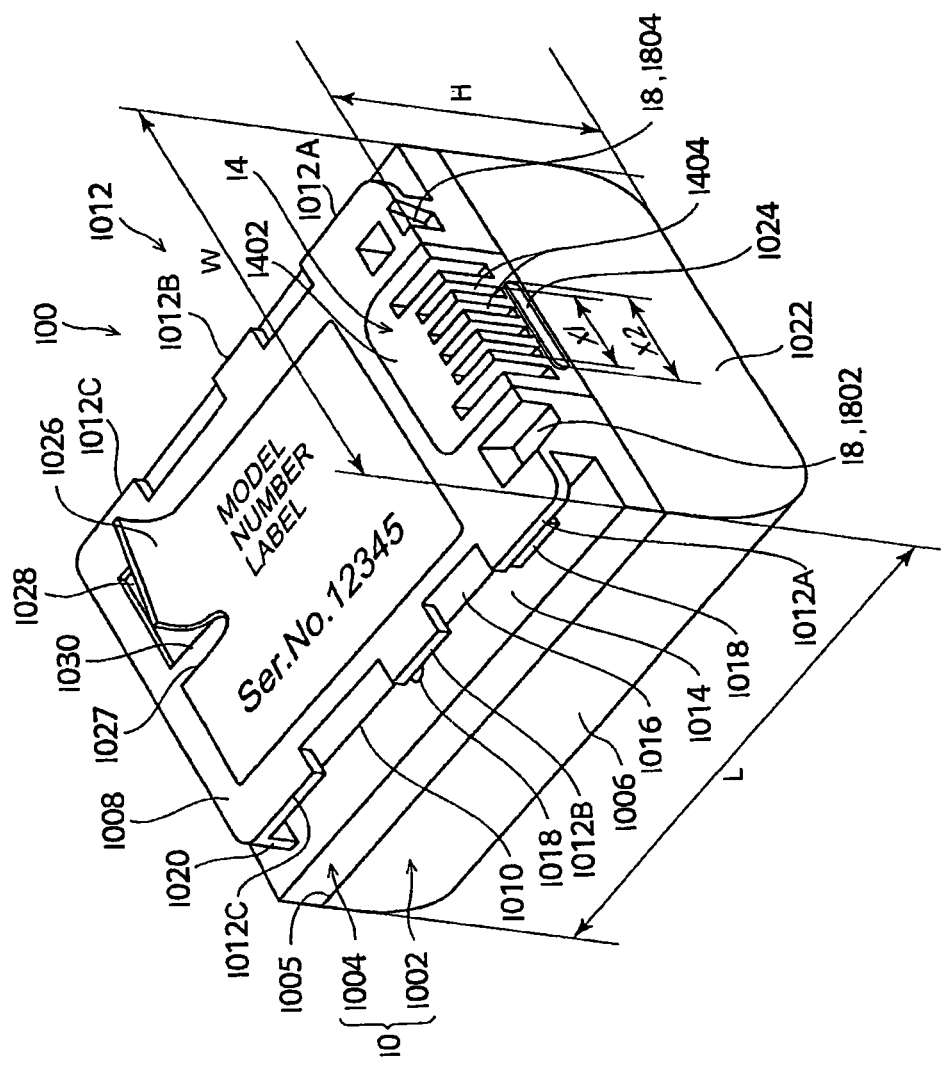
FIG. 1 is a perspective view of a battery apparatus of Embodiment 1, as viewed from the bottom thereof.
Figure 2:
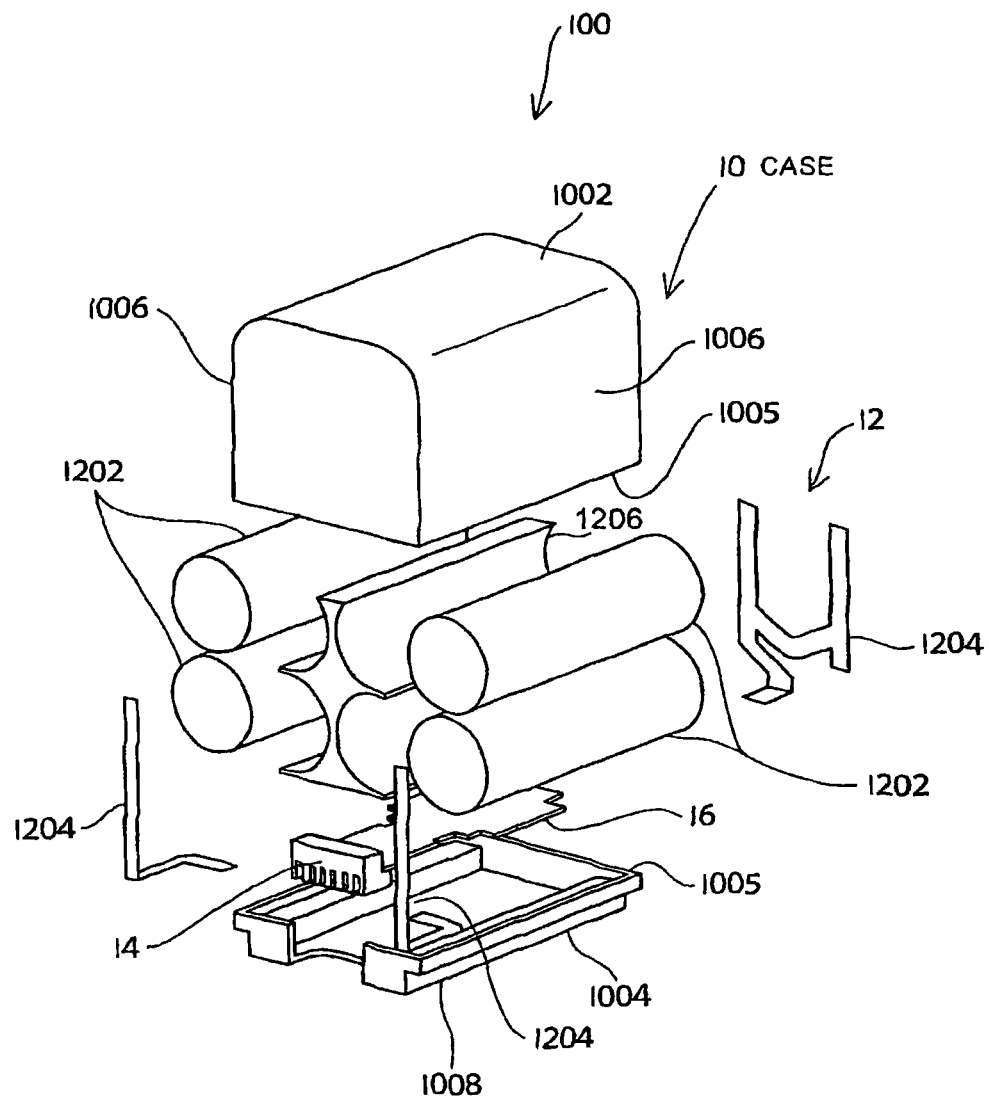
FIG. 2 is an exploded perspective view showing a configuration of the battery apparatus of Embodiment 1.

FIG. 1 is a perspective view of a battery apparatus of Embodiment 1, as viewed from the bottom thereof, and FIG. 2 is an exploded perspective view showing a configuration of the battery apparatus of Embodiment 1.

First, the battery apparatus will be described.

As shown in FIG. 1, a battery apparatus 100 includes a case 10, a rechargeable battery section 12 (see FIG. 2) provided inside the case 10, a control circuit board 16 provided inside the case 10, a battery-side terminal 14 provided on the case 10, and an identification section 18.

As shown in FIG. 2, the rechargeable battery section 12 has four column-shaped battery cells 1202, a plurality of wiring members 1204 for connection of the electrodes of these battery cells 1202, and a holding member 1206 set between the side surfaces of the respective battery cells 1202.

The control circuit board 16 is configured to be attached to the rechargeable battery section 12 by connection to the electrodes of the battery cells 1202 through the wiring members 1204, respectively, and to have a microcomputer including a CPU, a RAM, a ROM, and an interface, thereby performing data communication with external electronic equipment through the battery-side terminal 14. The above-mentioned data communication includes an operation of outputting identification data indicative of a characteristic (including a capacity, a suitable charging current value) of the battery apparatus 14. The identification data includes, e.g., data on whether or not the battery is quickly chargeable when attached to a battery charger, data indicative of a proper charging current value, or a maximum charging current value.

The battery-side terminal 14 is provided on a surface of the case 10, and is attached to the control circuit board 16 inside the case 10 for conduction to the electrodes of the battery cells 1202 through the respective wiring members 1204, whereby it is configured to supply an operating current to the external electronic equipment from the respective battery cells 1202, or to supply a charging current to the respective battery cells 1202 from the battery charger, through the battery terminal 14.

It should be noted that the number and shape of the battery cells 1202 that forms the rechargeable battery section 12 depends, of course, on the characteristic of the battery apparatus 100.

Next, a configuration of the case 10 will be described in detail.

Figure 3:
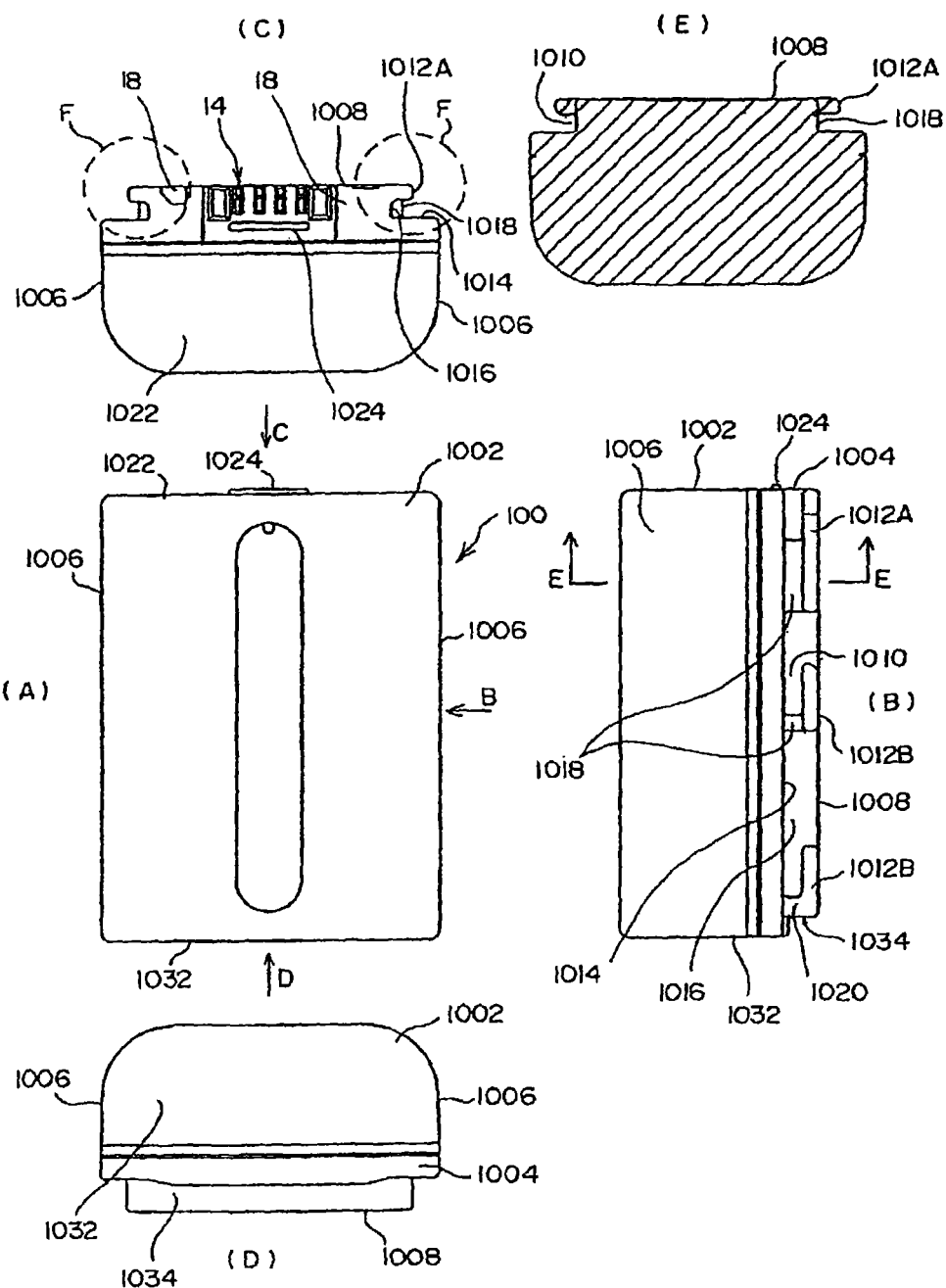
FIG. 3 is explanatory diagram of a battery apparatus 100.
Figure 4:
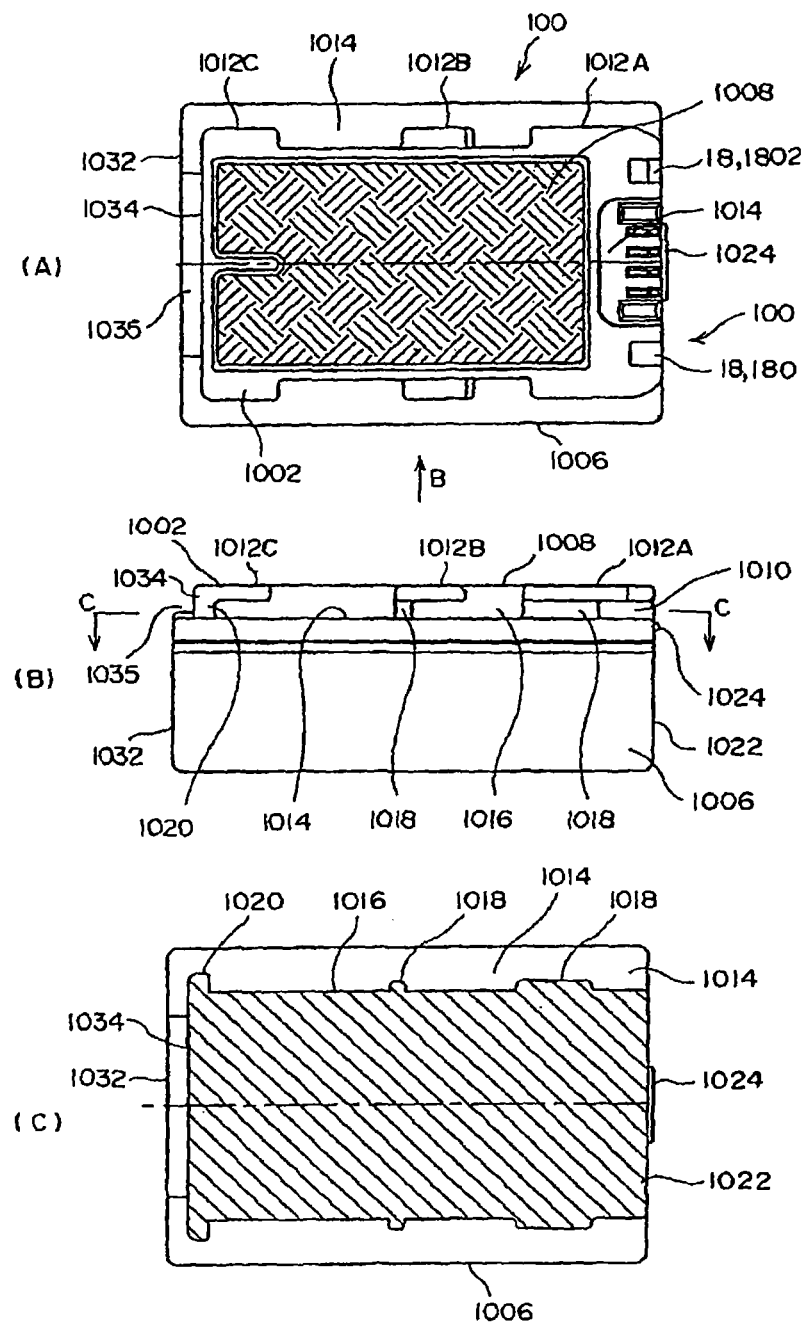
FIG. 4 is explanatory diagram of the battery apparatus 100.
Figure 5:
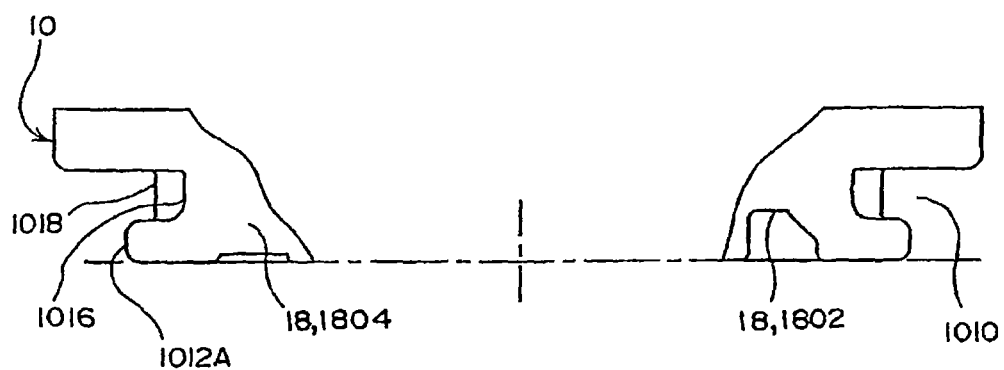
FIG. 5 is an enlarged view of a main portion of FIG. 3.
Figure 6:
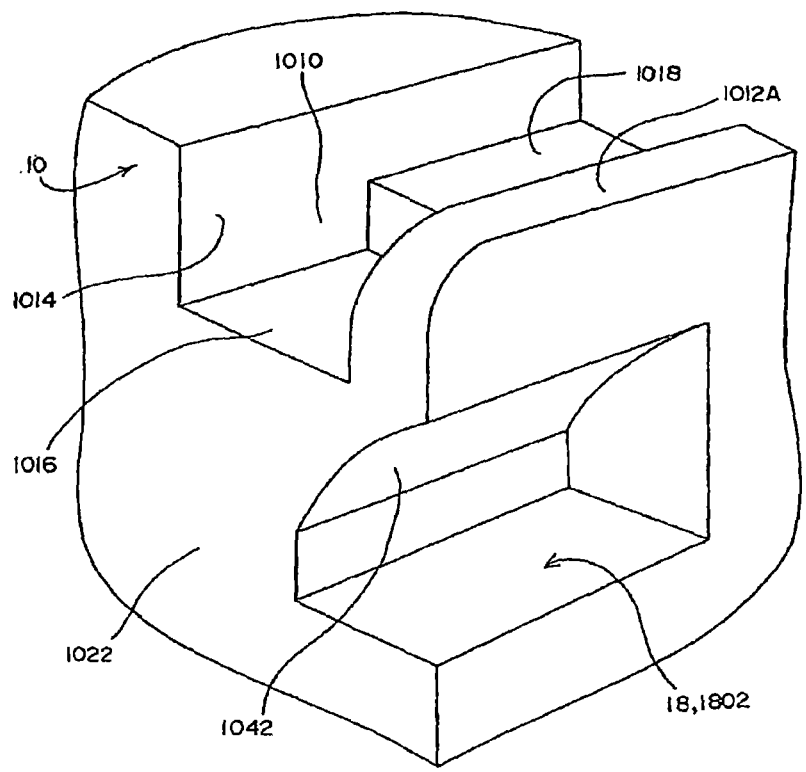
FIG. 6 is an enlarged perspective view of the vicinity of an identification section 1036.

FIG. 3 (A) is a plan view of the battery apparatus 100. FIG. 3 (B) is a view on arrow B of FIG. 3 (A). FIG. 3 (C) is a view on arrow C of FIG. 3 (A). FIG. 3 (D) is a view on arrow D of FIG. 3 (A). FIG. 3 (E) is a cross-sectional view taken along a line EE of FIG. 3 (B). FIG. 4 (A) is a bottom view of the battery apparatus 100. FIG. 4 (B) is a view on arrow B of FIG. 4 (A). FIG. 4 (C) is a cross-sectional view taken along a line CC of FIG. 4 (B). FIG. 5 is an enlarged view of a portion F of FIG. 3 (C). FIG. 6 is an enlarged perspective view of the vicinity of the identification section 18.

The case 10 has a body section 1002 that extends along a length direction L at an equal width W across, and a bottom section 1004 which is provided in the middle of the body section 1002 in a width direction W and at one end of the body section 1002 in a thickness direction H and which extends in the length direction L at an equal width, which is smaller than the width of the body section 1002, across.

In the present embodiment, the case 10 includes a first segment excluding a portion of the body section 1002 which is near the bottom section 1004, and the bottom section 1004, and a second segment including the portion of the body section 1002 which is near the bottom section 1004, and the bottom section 1004. The case 10 is formed by bonding these segments together along a bonding surface 1005. The rechargeable battery section 12 and the control circuit board 16 are accommodated inside these segments.

As shown in FIGS. 2, 3, 4, portions on both sides of the case 10 in the width direction W are formed as flat side surfaces 1006 which extend in parallel to each other in the length direction L, and one of surfaces of the case 10 in the thickness direction H is formed as a flat bottom surface 1008. In the present embodiment, side surfaces on both sides of the body section 1002 in the width direction W form the above-mentioned side surfaces 1006, and a bottom surface of the bottom section 1004 forms the above-mentioned bottom surface 1008.

From both sides of the bottom surface 1008 in the width direction W project a plurality of locking pieces 1012. In the present embodiment, three locking pieces 1012A, 1012B, 1012C are formed on each side so as to project outward in the width direction W, keeping a space therebetween in the length direction L. Each locking piece 1012 (1012A, 1012B, 1012C) portion which is positioned at one end in the thickness direction H is formed as a bottom surface positioned coplanar with the bottom surface 1008, and each locking piece 1012 (1012A, 1012B, 1012C) portion which is positioned at the other end in the thickness direction H is formed so as to be positioned coplanar with a surface parallel to the bottom surface 1008.

And when the three locking pieces 1012 (1012A, 1012B, 1012C) are provided in this way, the respective locking pieces 1012 (1012A, 1012B, 1012C), a side surface 1016 of the bottom section 1004 which is positioned on each of both sides in the width direction W, and a surface 1014 of the body section 1002 which faces the bottom section 1004 form three recessed portions 1010 in a bottom surface 1008 portion on each of both sides in the width direction W. Each recessed portion 1010 extends in the length direction L.

These locking pieces 1012 (1012A, 1012B, 1012C) are formed so as to position the case 10 thickness direction H in a battery attachment section of the electronic equipment. That is, when the bottom surface 1008 of the case 10 is aligned with an attachment surface of the battery attachment section of the electronic equipment and then the case 10 is slid thereover along the length direction L thereof, the locking pieces 1012 are locked into locking hooks of the battery attachment section, whereby the case 10 is positioned in the thickness direction H in the battery attachment section.

The battery-side terminal 14 is provided at a corner portion which is formed from an end surface 1022 and the bottom surface 1008 at one end in the length direction L.

As shown in FIG. 1, the battery-side terminal 14 includes a terminal case 1402 which is incorporated into the case 10 and which forms a part of the end surface 1022 and the bottom surface 1008 of the case 10, engaging grooves 1404 formed in a manner extending to both the end surface 1022 and the bottom surface 1008, and contact pieces provided inside the engaging grooves 1404.

The battery-side terminal 14 has a width extending width direction W of the case 10, a length extending in the length direction L of the case 10, and a thickness extending in the thickness direction H of the case 10.

Of the three locking pieces 1012 (1012A, 1012B, 1012C), the two locking pieces 1012A, 1012C are provided at locations near the ends of the case 10 in length direction L, and the remaining locking piece 1012B is provided at a location closer to the locking piece 1012A which is provided near the end of the case 10 where the battery-side terminal 14 is positioned.

In the present embodiment, at side surface 1016 portions of the bottom section 1004 corresponding to the two locking pieces 1012A, 1012B, there are provided two projections 1018 projecting outward in width direction W from each of the side surfaces 1016, respectively. The two projections 1018 are formed so as to be smaller in their projecting dimensions than the locking pieces 1012A, 1012B.

Through one of the two projections 1018, the locking piece 1012A, the surface 1014 along which the body section 1002 faces the bottom section 1004, and the side surface 1016 of the bottom section 1004 positioned on each of both sides in width direction W are connected to each other, and through the other projection 1018, the locking piece 1012B, the surface 1014, and the side surface 1016 are connected to each other. As a result, these two projections 1018 provide an advantage of improving the mechanical strength of the locking pieces 1012A, 1012B.

Further, a stopper wall 1020 is provided at each side surface 1016 portion of the bottom section 1004 which corresponds to the remaining locking piece 1012C and which is opposite to the location where the battery-side terminal 14 is provided. Each stopper wall 1020 closes an end of the corresponding recessed portion 1010 in the length direction L. When the battery apparatus 100 is to be attached to the battery attachment section, and if the battery apparatus 100 is not correctly oriented in the length direction L, the stopper wall 1020 serves to block attachment of the battery apparatus 100 in a wrong direction by abutment on the corresponding locking hooks of the battery attachment section.

Since each locking piece 1012C, the surface 1014, and the corresponding side surface 1016 are connected to each other by the corresponding stopper wall 1020, the stopper wall 1020 provides an advantage of improving the mechanical strength of the locking piece 1012C.

Further, in the present embodiment, as shown in FIG. 1, the end surface 1022 of the case 10 on which the battery-side terminal 14 is provided is formed as a flat surface.

In the present embodiment, the battery-side terminal 14 is provided in the middle of the end surface 1022 in the width direction W.

The identification section 18 serves to identify the characteristic of the battery apparatus 100. In the present embodiment, the identification section 18 is provided at locations which are on the end surface 1022 and which are on both sides of the battery side terminal 14 in the width direction W.

The identification section 18 includes identification recesses 1802, 1804 which are formed in a manner open to the end surface 1022. The identification recesses 1802, 1804 are provided at locations near the bottom surface 1008, and also formed in a manner open to the bottom surface 1008.

And at least one of the positions, the cross-sectional shapes, and the lengths of the identification recesses 1802, 1804 on the end surface 1022 is formed on the basis of the characteristic of the battery apparatus 100. In the present embodiment, the identification section 18 is formed such that the cross-sectional shape and length of the identification recess 1802 are based on the characteristic of the battery apparatus 100.

Note that in the present embodiment, as shown in FIG. 6, of surfaces forming the identification recess 1802, a surface portion close to the corresponding recessed portion 1010 is formed into an angled surface 1042 that nears the battery-side terminal 14 as it moves away from the bottom surface 1008, whereby to secure a thickness between that recessed portion 1010 and the identification recess 1802 and also to secure the mechanical strength of the corresponding locking piece 1012A.

And at a location on the end surface 1022 which is distant from the battery-side terminal 14 in the thickness direction H, a projection 1024 is formed in a manner projecting therefrom. The projection 1024 has an equal dimension in the thickness direction H, and linearly extends in the width direction W. The projection 1024 is formed at a location corresponding to the battery-side terminal 14, to have a length X2 which is greater than at least a length X1 of a portion where electrodes of the battery-side terminal 14 are disposed.

Further, as shown in FIG. 1, a recess 1028 is formed in the bottom surface 1008, and a model number label 1026 is stuck onto this recess 1028. It is also configured such that either the surface of the model number label 1026 is coplanar with the bottom surface 1008, or the surface of the model number label 1026 is positioned inward of the bottom surface 1008 as viewed from the case 10. A positioning projection 1030 is formed, which projects in the length direction L from a portion of the recess 1028 which is positioned opposite to the battery-side terminal 14 in the length direction L, so as to form the same surface as the bottom surface 1008. This projection 1030 is fitted into a positioning notch 1027 of the model number label 1026.

Further, as shown in FIGS. 4 (A) and (B), of end surfaces at both ends of the case 10 in the length direction L, the end surface of the body section 1002 which is positioned opposite to the battery-side terminal 14 is formed into a flat end surface 1032 that extends at right angles to the bottom surface 1008. An end surface of the bottom section 1004 which is positioned opposite to the battery-side terminal 14 is formed into a flat end surface 1034 that parallels the end surface 1032 at a location inward of the above-mentioned end surface 1032 as viewed from the case 10. Therefore, a cut portion 1035 is formed from these end surfaces 1032, 1034 at an end which is positioned opposite to the battery-side terminal 14 in the length direction L of the case 10, and along which the body section 1002 borders the bottom section 1004.

Further, as shown in FIGS. 1 to 6, two identification portions 18 are formed at locations on both sides of the bottom surface 1008 of the bottom section 1004, which interpose the battery-side terminal 14 therebetween in the width direction W. These identification portions 18 are formed as a recess 1804 that is open both in the thickness direction H and the length direction L, or formed as a recess 1802 that is open in the thickness direction H and closed in the length direction L. The identification portions 18 are identified by identification means provided on the side of the electronic equipment, and their identification is made on the basis of the shapes of the recesses 1804, 1802, or the length L of the recess 1804.

Note that, of surfaces forming the recess 1804, a surface portion which is nearest to the recessed portion 1010 is formed into an angled surface 1042, whereby a thickness between that recessed portion 1010 and the recess 1038 is secured to secure the mechanical strength of the locking piece 1012A.

Next, the imaging apparatus 200 will be described.

Figure 7:
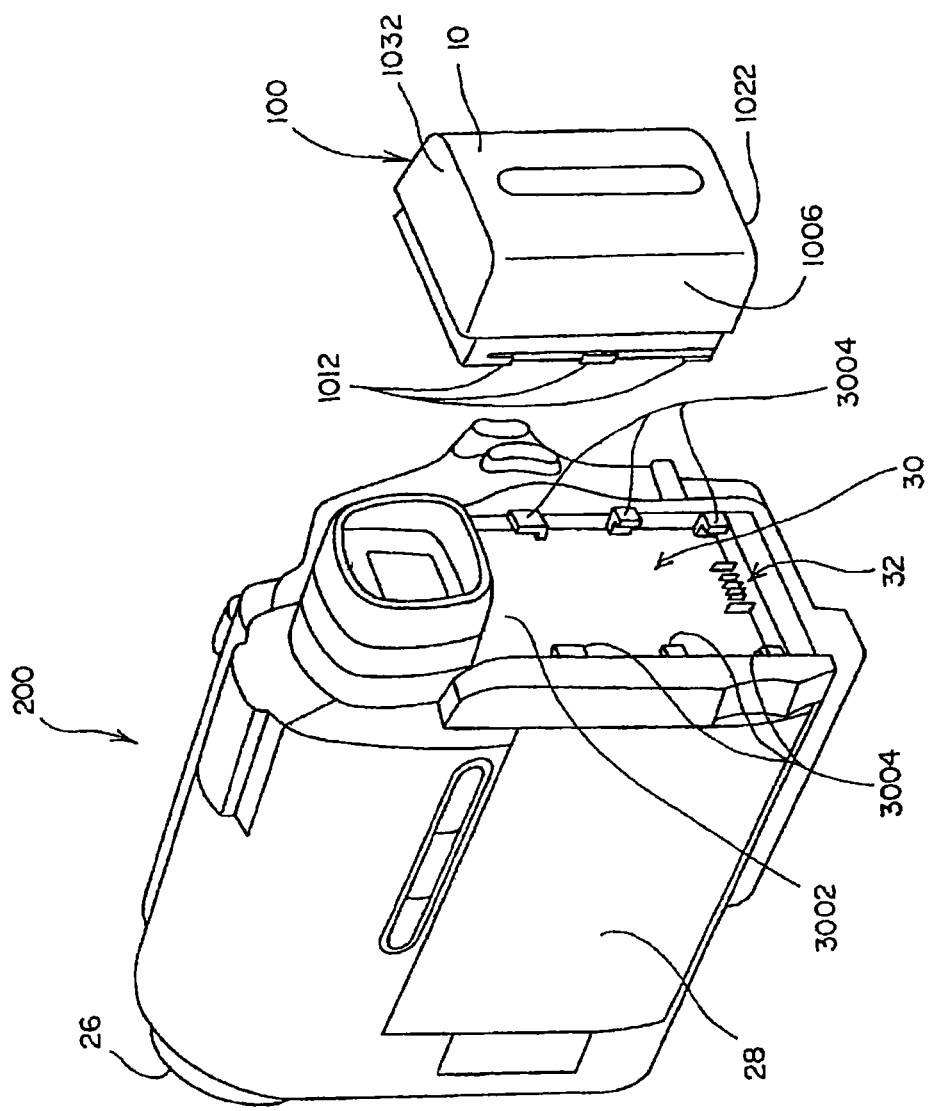
FIG. 7 is a perspective view of an imaging apparatus 200 to which the battery apparatus 100 is externally attached.
Figure 8:
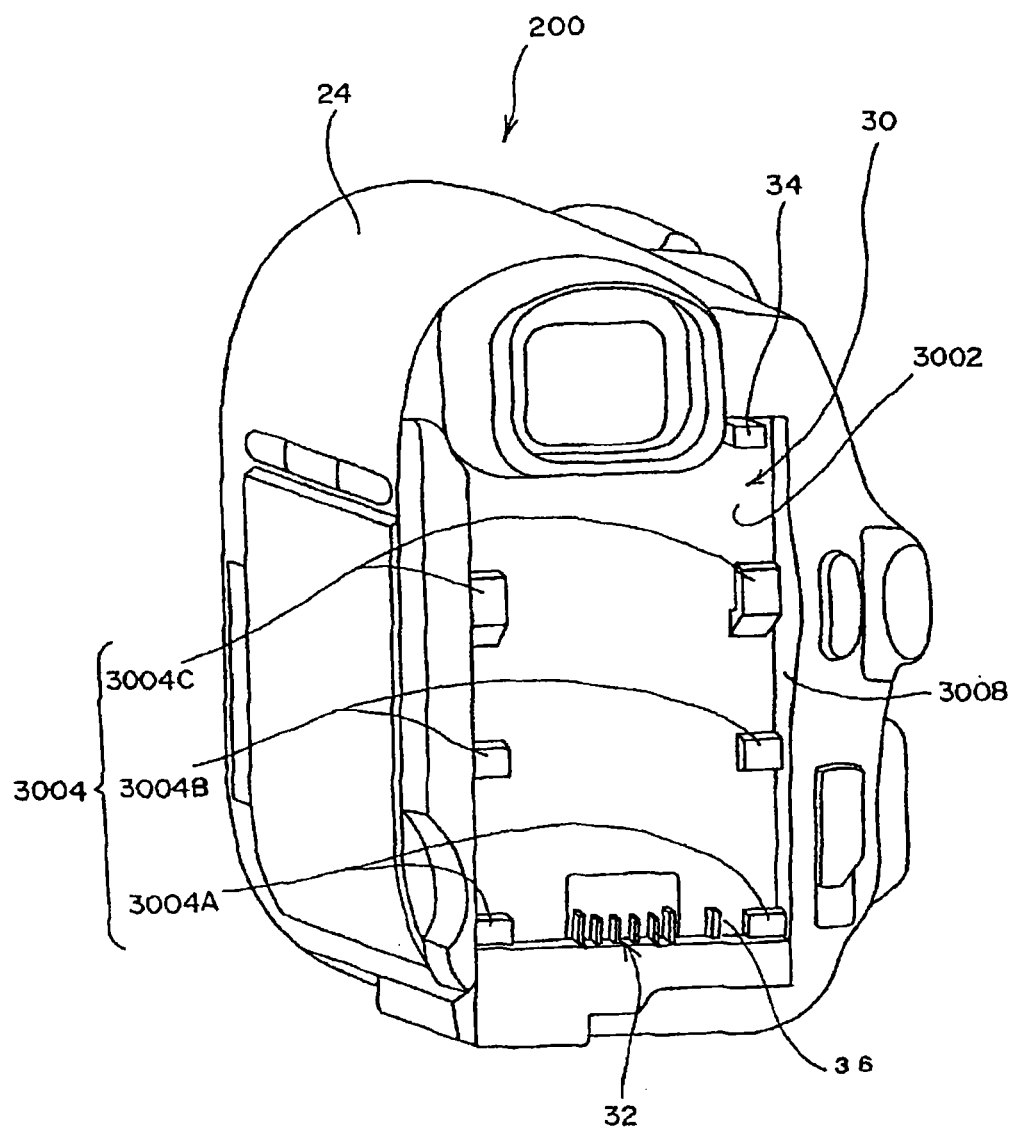
FIG. 8 is an enlarged view of a battery attachment section of the imaging apparatus 200.
Figure 9:
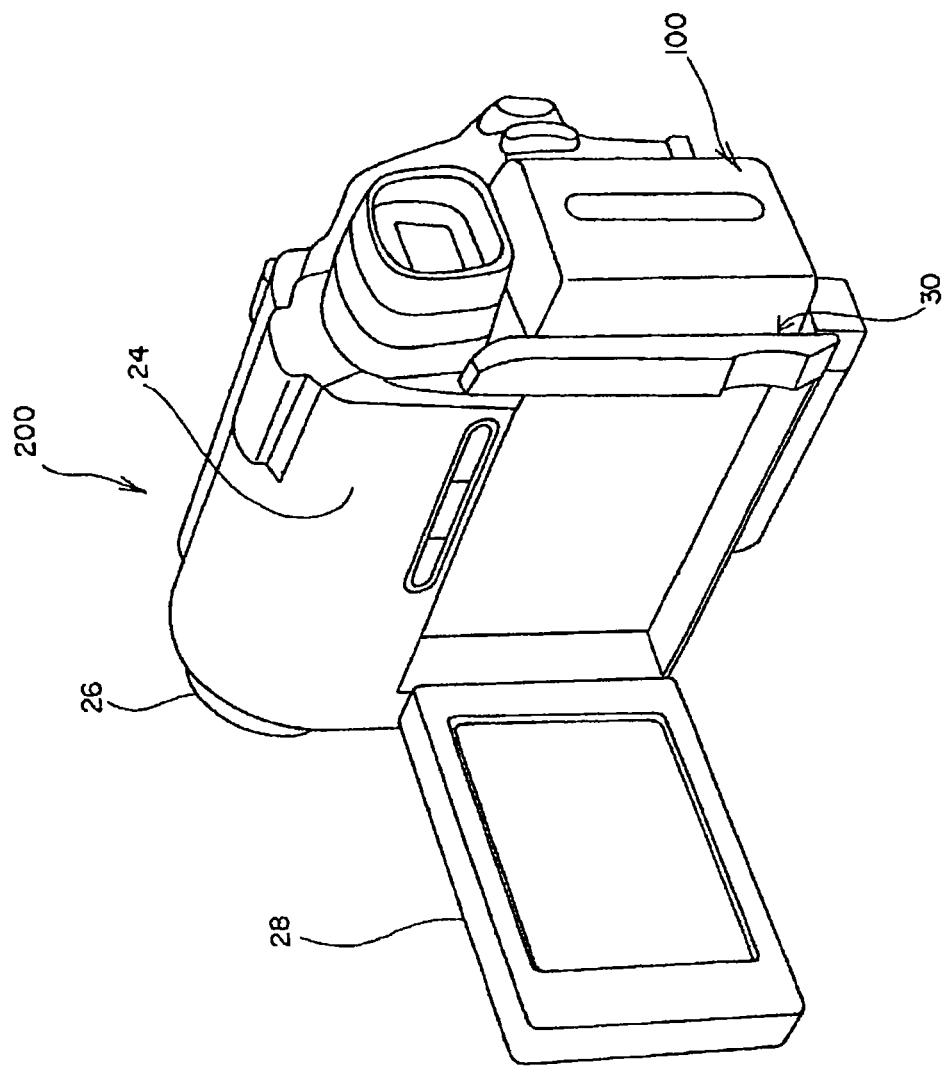
FIG. 9 is a perspective view of the imaging apparatus 200 showing a state in which the battery apparatus 100 is attached thereto.

FIG. 7 is a perspective view of the imaging apparatus 200 to which the battery apparatus 100 is externally attached. FIG. 8 is an enlarged view of the battery attachment section of the imaging apparatus 200. FIG. 9 is a perspective view of the imaging apparatus 200 showing a state in which the battery apparatus 100 is attached thereto.

As shown in FIGS. 7 and 8, the imaging apparatus 200 includes a case 24, an optical system 26 incorporated into the front of the case 24, an image pickup device, not shown, for imaging an object captured by the optical system 26, a liquid-crystal display section 28 for displaying an image formed by the image pickup device, a recording/reproducing section, not shown, for recording and/or reproducing the image captured by the image pickup device on and/or from a recording medium, the above-mentioned image pickup device, liquid-crystal display section 28, an identification projection 36, and the battery apparatus 100.

In the rear of the case 24 is a battery attachment section 30 to which the battery apparatus 100 is to be releasably attached.

The battery attachment section 30 has a flat attachment surface 3002, a plurality of locking hooks 3004 (3004A, 3004B, 3004C) provided on the attachment surface 3002, an attachment section-side terminal 32 that can come in contact with the battery-side terminal 14, an attachment projection 34 provided on the attachment surface 3002, and the identification projection 36.

The attachment surface 3002 has a width corresponding to the width of the bottom surface 1008 of the case 10 of the battery apparatus 100, and a length greater than the length of the bottom surface 1008, and has side surfaces 3008 erected from peripheral sides of the attachment surface 3002.

The attachment section-side terminal 32 is provided at an end of the placement surface 3002 in the length direction L, which is opposite to the optical system 26, for connection to the battery-side terminal 14 to supply power of the battery apparatus 100 to the recording/reproducing section. In the present embodiment, the attachment section-side terminal 32 is formed, as shown in FIG. 7, from a plurality of plate-shaped contact pieces for insertion into the engaging grooves 1404 of the battery-side terminal 14.

The attachment projection 34 is provided at a location on the attachment surface 3002 which is opposite to the attachment section-side terminal 32 in a longitudinal direction of the attachment surface 3002, so as to be retractable from the attachment surface 3002, and is configured to be urged so as to project from the placement surface 3002 at all times, and retract inward of the placement surface 3002 upon operation of an unlocking button, not shown.

The locking hooks 3004 (3004A, 3004B, 3004C) are provided in a number corresponding to the number of locking pieces 1012 of the battery apparatus 100. In the present embodiment, there are provided three locking hooks 3004 on each of both sides of the attachment surface 3002 in the width direction, and formed so as to be lockable with the locking pieces 1012 (1012A, 1012B, 1012C).

Figure 10:
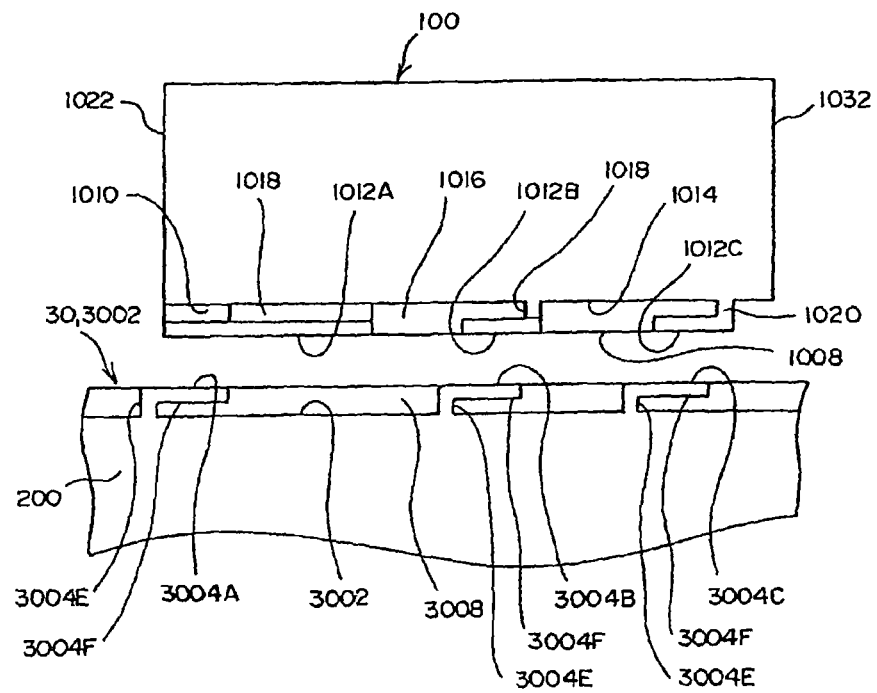
FIG. 10 is a diagram explaining attachment of the battery apparatus 100 to the battery attachment section.

Each of the locking hooks 3004 (3004A, 3004B, 3004C) is provided with, as shown in FIG. 10, a vertical wall 3004E erecting from the placement surface 3002, and a horizontal wall 3004F projecting from the distal end of the vertical wall 3004E in a manner paralleling the placement surface 3002.

Of the three locking hooks 3004 (3004A, 3004B, 3004C), the two locking hooks 3004A, 3004C are provided at locations near ends of the attachment surface 3002 in the length direction, and the remaining locking hook 3004B is provided at a location closer to the locking hook 4003A provided near the end of the attachment surface 3002 where the attachment section-side terminal 32 is positioned.

And the case 10 is aligned with the attachment surface 3002 both in the width direction W and the length direction L, respectively, to cause the battery-side terminal 14 of the battery apparatus 100 to face the attachment section-side terminal 32 of the battery attachment section 30, and also to cause the bottom surface 1008 of the battery apparatus 100 to face the attachment surface 3002 of the battery attachment section 30, and then the locking pieces 1012 (1012A, 1012B, 1012C) of the battery apparatus 100 are spaced apart from the locking hooks 3004 (3004A, 3004B, 3004C) in the above-mentioned length direction L direction, respectively. Under this state, the bottom surface 1008 of the battery apparatus 10 is abutted on the attachment surface 3002 of the battery attachment section 30, whereby the battery apparatus 100 is slid in such a direction as to cause the battery-side terminal 14 to near the attachment section-side terminal 32 in the length direction of the case.

As a result, the plurality of locking hooks 3004 are inserted into the corresponding recessed portions 1010 to be locked with the locking pieces 1012. The bottom surface 1008 of the case 10 is aligned with the attachment surface 3002, whereby to regulate the movement of the battery apparatus 100 toward the attachment surface 3002. Furthermore, the locking hooks 3004 and the locking pieces 1012 are locked together, whereby to regulate the movement of the battery apparatus 100 away from the attachment surface 3002. In this case, it may otherwise be configured such that the locking hooks 3004 and the locking pieces 1012 are engaged, whereby to regulate the movement of the battery apparatus 100 both toward and away from the attachment surface 3002.

In the battery apparatus 100, of the two end surfaces of the case 10 in the length direction L, the end surface 1022 on the side of the battery-side terminal 14 abuts onto one of the side surfaces 3008 of the battery attachment section 30, with the locking hooks 3004 and the locking pieces 1012 locked together, and the attachment projection 34 engages with the cut portion 1035 of the battery apparatus 100, whereby to regulate the movement of the case 10 in the length direction L. As a result, attachment of the battery apparatus 100 in the battery attachment section 30 is implemented, and thus the battery apparatus 100 is held therein.

In the present embodiment, the distal ends of the locking hooks 3004 and the corresponding ends of the projections 1018 come in contact with each other, with the locking hooks 3004 and the locking pieces 1012 locked together, to regulate the movement of the battery apparatus 100 in the above-mentioned width direction W. In this case, it may otherwise be configured such that other portions of the battery apparatus 100 are brought into contact with other portions of the battery attachment section 30 whereby to regulate the movement of the battery apparatus 100 in the above-mentioned width direction W, by, e.g., bringing the side surfaces 1006 of the case 10 of the battery apparatus 100 into contact with the side surfaces 3008 of the battery attachment section 30, instead of bringing the distal ends of the locking hooks 3004 into contact with the corresponding ends of the projections 1018.

And when the battery apparatus 100 has been attached to the battery attachment section 30, the battery-side terminal 14 of the battery apparatus 100 comes in contact with the attachment section-side terminal 32 of the battery attachment section 30.

The identification projection 36 is formed so as to be inserted into the identification recess 1802 of the battery apparatus 100 having the characteristic usable for the imaging apparatus 200, with the battery apparatus 100 attached to the battery attachment section 30.

In the present embodiment, as shown in FIG. 8, one identification projection 36 is provided at a location on a side surface 3008 which is positioned on one side of the battery-side terminal 14 in the width direction. More particularly, the identification projection 36 is provided at a location on the side surface 3008, which is near the attachment surface 3002, and a portion of the identification projection 36 facing the attachment surface 3002 is connected with the attachment surface 3002, and thus the strength, rigidity of the identification projection 36 are ensured.

Figure 11:
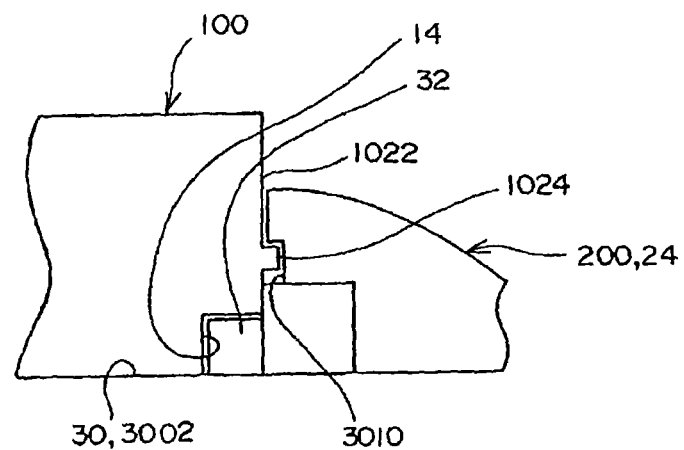
FIG. 11 is an explanatory diagram showing a state in which the battery apparatus 100 is attached to a battery attachment section 30.

When the battery apparatus 100 has been attached to the battery attachment section 30, a gap may be formed in some case, as shown in FIG. 11, between the end surface 1022 on the side of the battery-side terminal 14 of the battery apparatus 100 and a portion of the case 24 (a side surface 3008 of a recess 3006) of the imaging apparatus 200, which is opposed to the end surface 1022.

In this case, a recessed groove 3010 is formed in the side surface 3008 of the recess 3006, and the projection 1024 of the battery apparatus 100 is fitted into this recessed groove, whereby the above-mentioned gap can be closed by the projection 1024. Thus, this configuration provides an advantage of reliably preventing entrance of, e.g., foreign matter having conductivity from the above-mentioned gap to allow the foreign matter to come in contact with connections between the battery-side terminal 14 and the attachment section-side terminal 32.

Figure 12:
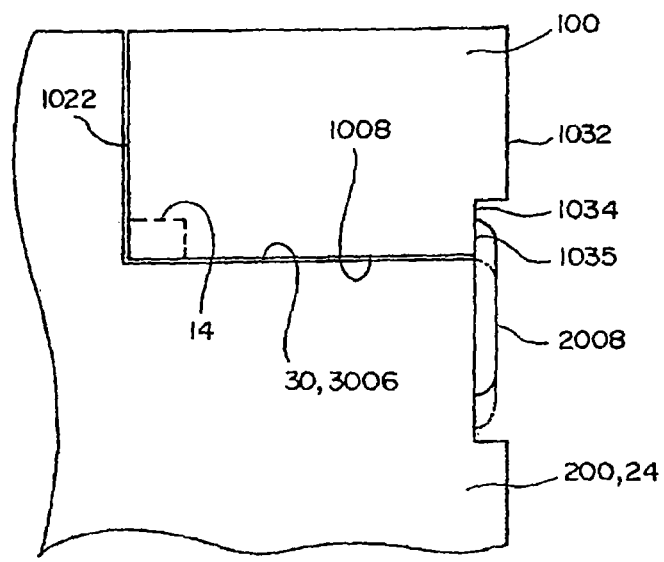
FIG. 12 is an explanatory diagram of a locking mechanism.

Further, as shown in FIG. 12, it may alternatively be configured as follows. That is, a locking hook 2008, which slides toward and away from the cut portion 1035 of the battery apparatus 100 that has been attached to the battery attachment section 30, and which is urged by an urging member, such as a spring, toward the cut portion 1035 at all times, is provided on the case 24. The locking hook 2008 is engaged with the cut portion 1035, whereby to prevent the dropping of the battery apparatus 100 from the battery attachment section 30, and the locking hook 2008 is disengaged from the cut portion 1035 of the battery apparatus 100, whereby to allow the battery apparatus 100 to be detached from the battery attachment section 30.

In this case, since the cut portion 1035 is formed so as to be inward of the end surface 1032 as viewed from the battery apparatus 100, the locking hook 2008 can be provided inward of the outer surface of the case 24, and thus the locking hook 2008 can be formed in a manner not projecting outward from the outer surface of the case 24 of the imaging apparatus 200. Therefore, this configuration is advantageous in miniaturizing the imaging apparatus 200 and improving its designability.

Furthermore, in this case, the portion of the locking hook 2008 which engages with the cut portion 1035 is urged toward the bottom surface 1008 of the battery apparatus 100 at all times, and thus when the bottom surface 1008 of the battery apparatus 100 is slid along the attachment surface 3006 for attaching the battery apparatus 100 to the battery attachment section 30 or detaching the battery apparatus 100 from the battery attachment section 30, the distal end of the locking hook 2008 projecting toward the bottom surface 1008 by the above-mentioned urging mechanism abuts on the surface of a label of the model number label 1026 or the like, which has been stuck onto the bottom surface 1008, making it likely to wear off a printed portion on the surface of, e.g., the model number label 1026 due to friction.

In this case, if the locking hook 2008 is disposed such that the distal end thereof abuts on the positioning projection 1030 and thus does not abut on the surface of the model number label 1026, the surface of the model number label 1026 is less subject to damage or foul. Thus, this configuration is advantageous in protecting the printed portion on the surface of the model number label 1026. In this case, it may be acceptable if the positioning projection 1030 is provided coplanar with the surface of the model number label 1026 or so as to be positioned outward of the surface of the model number label 1026 as viewed from the case 10.

Furthermore, using the position of the end surface 1022 of the case 100 as a reference, whether or not the battery apparatus 100 is a genuine one can be determined on the basis of the position of each projection 1018 provided in the above-mentioned length direction L direction (or the presence/absence of each projection 1018 or the number of projections 1018).

Figure 13:
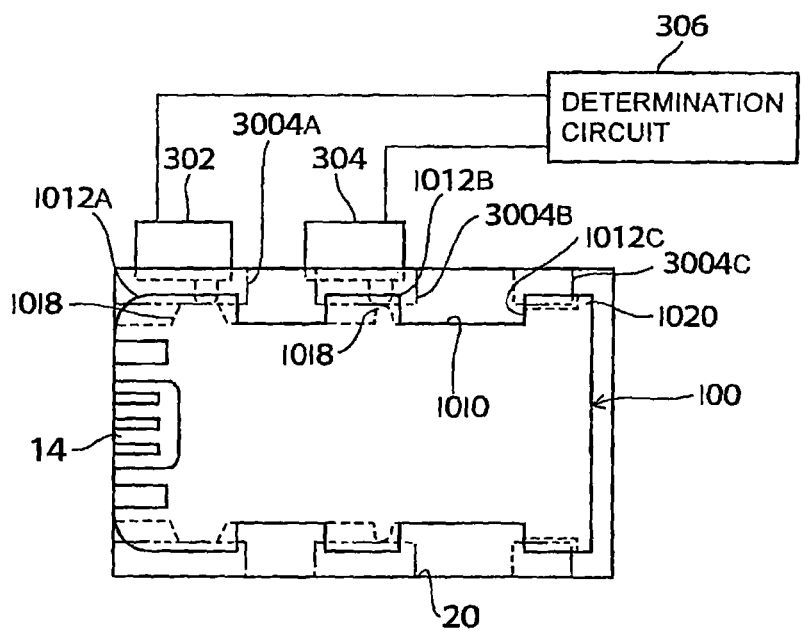
FIG. 13 is a block diagram showing a determination circuit for projections 1018.

For example, as shown in FIG. 13, sensors 302, 304 are provided in a battery accommodating chamber 20. The sensors 302, 304 are formed from microswitches for sensing the positions of the projections 1018 as viewed in the above-mentioned length direction L, using the end surface 1022 of the case 100 as a reference. And a determination circuit 306 is provided, which serves to determine whether or not the projections 1018 are in their correct position on the basis of sensed signals from the respective sensors 302, 304.

According to such a configuration, supply of power from the battery apparatus 100 is permitted only when the battery apparatus 100 is recognized as a genuine product on the basis of a determination result of the determination circuit 306. Otherwise, supply of power from the battery apparatus 100 can be prohibited, to prevent use of any ungenuine battery apparatus 100.

Furthermore, the above-mentioned identification data on the battery apparatus 100 can be indicated according to the position of each projection 1018 provided in the above-mentioned length direction L, or the presence/absence of each projection 1018, or the number of projections 1018.

For example, according to the configuration shown in FIG. 13, four types of identification data can be represented by a combination of the on/off states of the two sensors 302, 304. Therefore, if four sensors are provided such that the positions of a total of four projections 1018 provided on both sides of the case 10 of the battery apparatus 100 in the width direction can be sensed, it goes without saying that as many as eight types of identification information can be obtained.

Furthermore, using as the sensor one capable of measuring the position of each projection 1018 as viewed in the above-mentioned length direction, using the end surface 1022 as a reference, it goes without saying that the number of types of identification data that can be sensed by the sensor can further be increased.

Furthermore, if the electronic equipment to which the battery apparatus 100 is attached is a battery charger for charging the battery apparatus 100, it may be acceptable to provide the battery charger with one or more sensors similar to the above-mentioned sensors 302, 304, to sense attachment/detachment of the battery apparatus 100 using the sensors, and to start the operation of charging the battery apparatus 100 in response to the sensing operation.

Furthermore, if the positions of the projections 1018 are determined with the above-mentioned sensors, it may also be implementable to cause the battery charger to judge the characteristic (capacity, suitable charging current value, quick chargeablility, or the like) of the battery apparatus 100.

Furthermore, as shown in FIG. 1, it is configured such that the surface of the model number label 1026 is coplanar with the bottom surface 1008, or such that the surface of the model number label 1026 is positioned inward of the bottom surface 1008 as viewed from the case 10. Also, the positioning projection 1030 forming the same surface as the bottom surface 1008 is fitted into the positioning notch 1027 of the model number label 1026. Thus, even if the bottom surface 1008 of the battery apparatus 100 comes in frictional contact with the attachment surface 3002 of the battery attachment section 30 due to the battery apparatus 100 being attached to and detached from the battery attachment section 30, the surface of the model number label 1026 is less subject to damage or foul. Thus, this configuration is advantageous in protecting the label on the model number label 1026.

Figure 14:
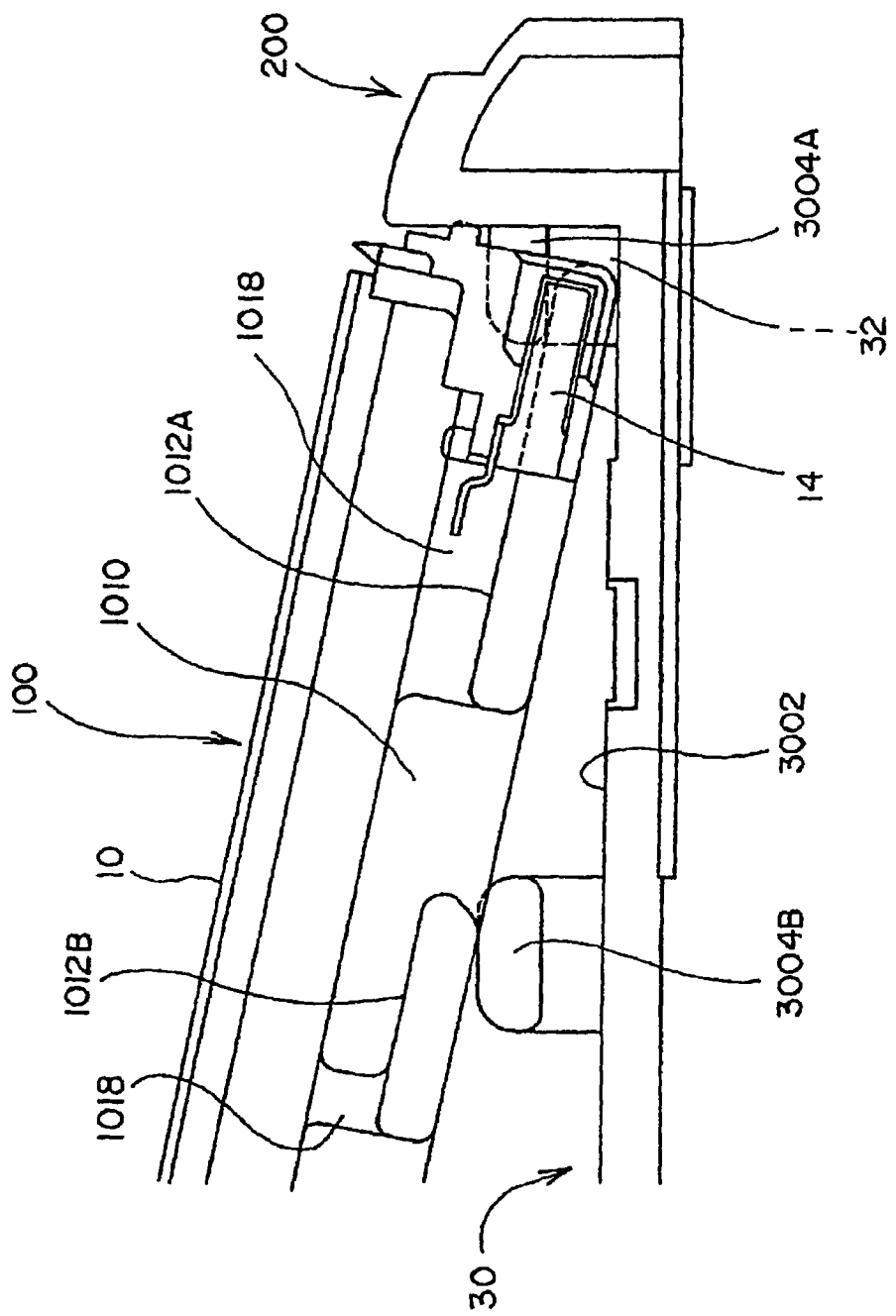
FIG. 14 is an explanatory diagram showing a state in which the battery apparatus 100 is attached to the battery attachment section 30 at an angle.

Furthermore, as shown in FIG. 14, when the battery apparatus 100 is attached to the battery attachment section 30 at an angle, the locking piece 1012A provided near the end of the case 100 at which the battery-side terminal 14 is positioned is locked into the locking hook 3004A positioned near the attachment section-side terminal 32. However, the locking piece 1012B provided at the location closer to the above-mentioned locking piece 1012A abuts on the locking hook 3004B, to make great an angle of inclination formed by the battery apparatus 100 with respect to the attachment surface 3002, i.e., an angle formed between the bottom surface 1008 of the case 10 of the battery apparatus 100 and the attachment surface 3002 of the battery attachment section 30.

Therefore, it can be determined instantly that the battery apparatus 100 is attached imperfectly, and thus this configuration is advantageous in attaching the battery apparatus 100 reliably.

In the present embodiment, since the locking piece 1012B is disposed so as to be closer to the locking hook 3004A which is positioned near the attachment section-side terminal 32, the inclination of the battery apparatus 100 with respect to the attachment surface 3002 increases when the battery apparatus 100 is attached imperfectly, and thus it can be determined further simply that the battery apparatus 100 is attached imperfectly.

Note that if the angle of the battery apparatus 100 with respect to the attachment surface 3002 is ten degrees or more, the inclination of the battery apparatus 100 can be determined instantly.

Furthermore, in FIG. 10, of the locking hooks 3004 of the imaging apparatus 200, if the length of the locking hook 3004A which is near the attachment section-side terminal 32 is made shorter than those of the other two locking hooks 3004B, 3004C, the following advantages can be provided.

That is, when attachment of the battery apparatus 100 to the battery attachment section 30 is imperfect, i.e., when the two locking pieces 1012B, 1012C are not locked into the locking hooks 3004B, 3004C, even if the locking piece 1012A provided near the end of the case 100 where the battery-side terminal 14 is positioned is locked into the locking hook 3004A positioned near the attachment section-side terminal 32, the battery apparatus 200 inclines in such a direction as to be away from the attachment surface 3002 by the self weight of the battery apparatus 100, and this angle of inclination increases with decreasing length of the locking hook 3004A which is near the attachment section-side terminal 32. As a result, similarly to what has been mentioned above, the inclination of the battery apparatus 100 with respect to the attachment surface 3002 increases when attachment of the battery apparatus 100 is imperfect, and thus it can be determined further simply that the battery apparatus 100 is attached imperfectly.

Next, advantages of the present embodiment will be described.

According to the battery apparatus 100 and the imaging apparatus 200 of the present embodiment, the battery apparatus 100 is provided with the identification recesses 1802, 1804 which are based on the characteristic of the battery apparatus 100, and the battery attachment section 30 is provided with the identification projection 36 for insertion into the identification recess 1802 of the battery apparatus 100 having the characteristic usable for the imaging apparatus 200.

Therefore, attachment of the battery apparatus 100 having the characteristic usable for the imaging apparatus 200, to the battery attachment section 30 is permitted by the identification projection 36 being inserted into the identification recess 1802.

On the other hand, the identification recess 1802 of a battery apparatus 100 not having the characteristic usable for the imaging apparatus 200 does not permit insertion of the identification projection 36 thereinto, and thus attachment of the battery apparatus 100 not having the characteristic usable for the imaging apparatus 200, to the battery attachment section 30 is prohibited by the identification projection 36 not being inserted into the identification recess 1802.

As a result, the battery apparatus 100 having the characteristic compatible with the imaging apparatus 200 can be attached suitably. For example, to an imaging apparatus 200 that consumes a large amount of current, attachment is permitted of a battery apparatus 100 having a large capacity that can hold the large amount of current to be consumed, and attachment is prohibited of a battery apparatus 100 having a small capacity that cannot hold the above-mentioned large amount of current to be consumed. Alternatively, to an imaging apparatus 200 that consumes a small amount of current, attachment is permitted of a battery apparatus 100 having capacities ranging from a small capacity corresponding to the current to be consumed, to a large capacity.

And in the battery apparatus 100, portions which are inward of an end surface that is at one end of the case 10 in the length direction, and which are on both sides of the battery-side terminal 14 in the width direction are left as a dead space where neither boards nor electronic components are disposed. Thus, even if the identification recess 1802 is provided in the end surface of the case 10, it does not increase the size of the case 10. Therefore, this configuration is not a hindrance to miniaturizing the battery apparatus 100. To describe it in more detail, an end surface, which is positioned opposite to the bottom surface 1008 of the case 10 in the thickness direction of the battery-side terminal 14, is positioned inside the case 10. Although lead wires for connection to the control circuit board 16 are positioned at locations on this end surface, not only portions which are near the bottom surface 1008 of the case 10 and which are on both sides of the battery-side terminal 14 in the width direction and portions which are in the middle of the battery-side terminal 14 in the thickness direction and which are on both sides of the battery-side terminal 14 in the width direction, but also portions which are positioned inside the case 10 which are near the end surface of the battery-side terminal 14 and which are on both sides of the battery-side terminal 14 in the width direction are left as a dead space where neither components nor members are disposed. Thus, even if the identification recess 1802 is provided, it does not increase the size of the case 10. Therefore, this configuration is not a hindrance to miniaturizing the battery apparatus 100. Further, the identification projection 36 provided on the battery attachment section 30 of the imaging apparatus 200 is acceptable as long as it has a shape that can be inserted into the identification recess 1802 of the battery apparatus 100, and thus this configuration is not a hindrance to miniaturizing the imaging apparatus 200, similarly to the case of the battery apparatus 100.

Note that the case where the identification recess 1802 is formed in a manner open to both the end surface and the bottom surface has been described in the present embodiment. However, the identification recess 1802 may otherwise be formed in a manner closed at the bottom surface. However, when the identification recess 1802 is formed in a manner open to both the end surface and the bottom surface as in the embodiment, the identification projection 36 can be formed so as to be connected to both the attachment surface 1008 and the side surface 3008, and thus this configuration is advantageous in maintaining the strength of the identification projection 36.

The present embodiment will be described in more detail with reference to FIGS. 15, 16.

Figure 15:
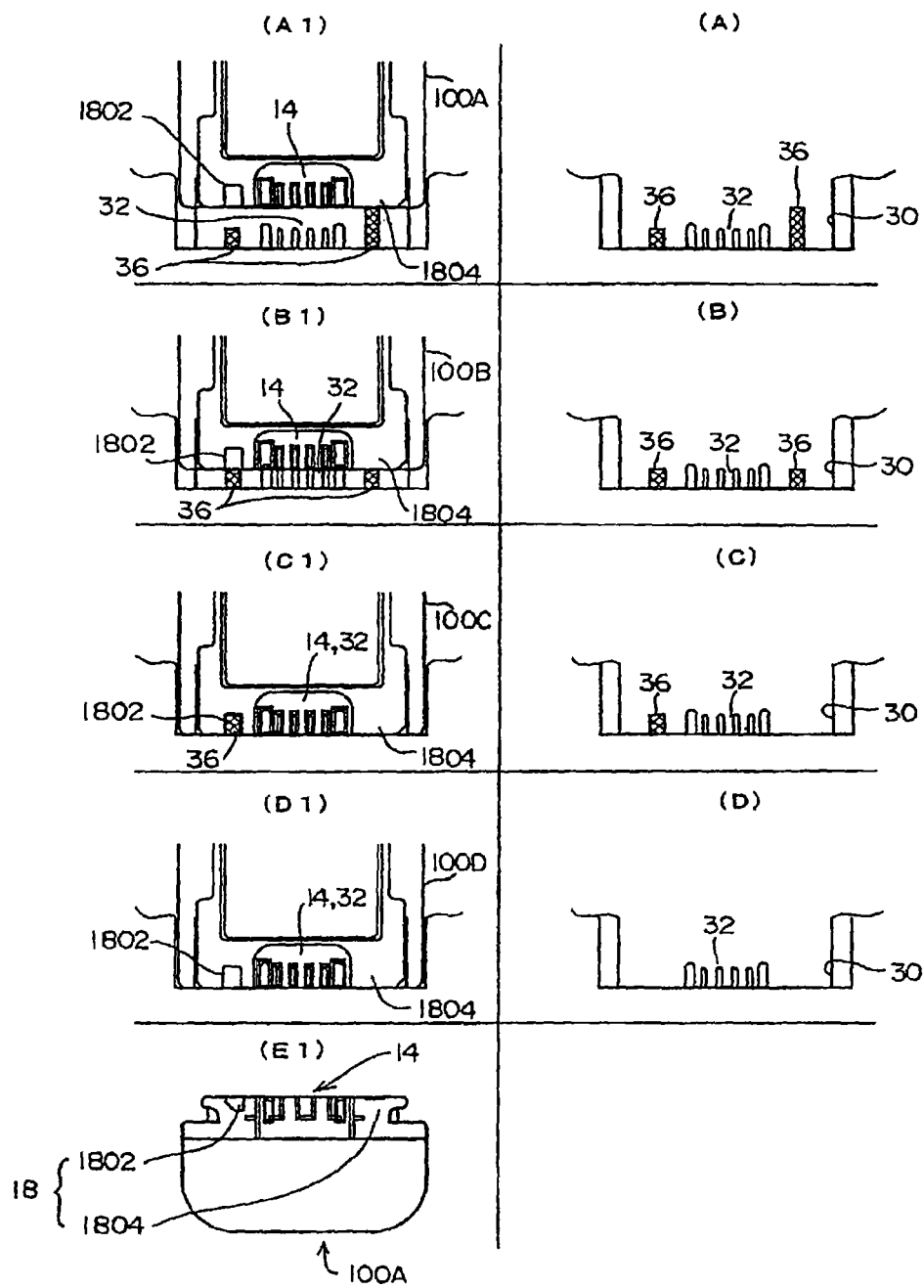
FIG. 15 is an explanatory diagram showing the relationship between identification recesses 1802, 1804 of an identification section 18 of the battery apparatus 100 and identification projections 36 of the imaging apparatus 200.
Figure 16:
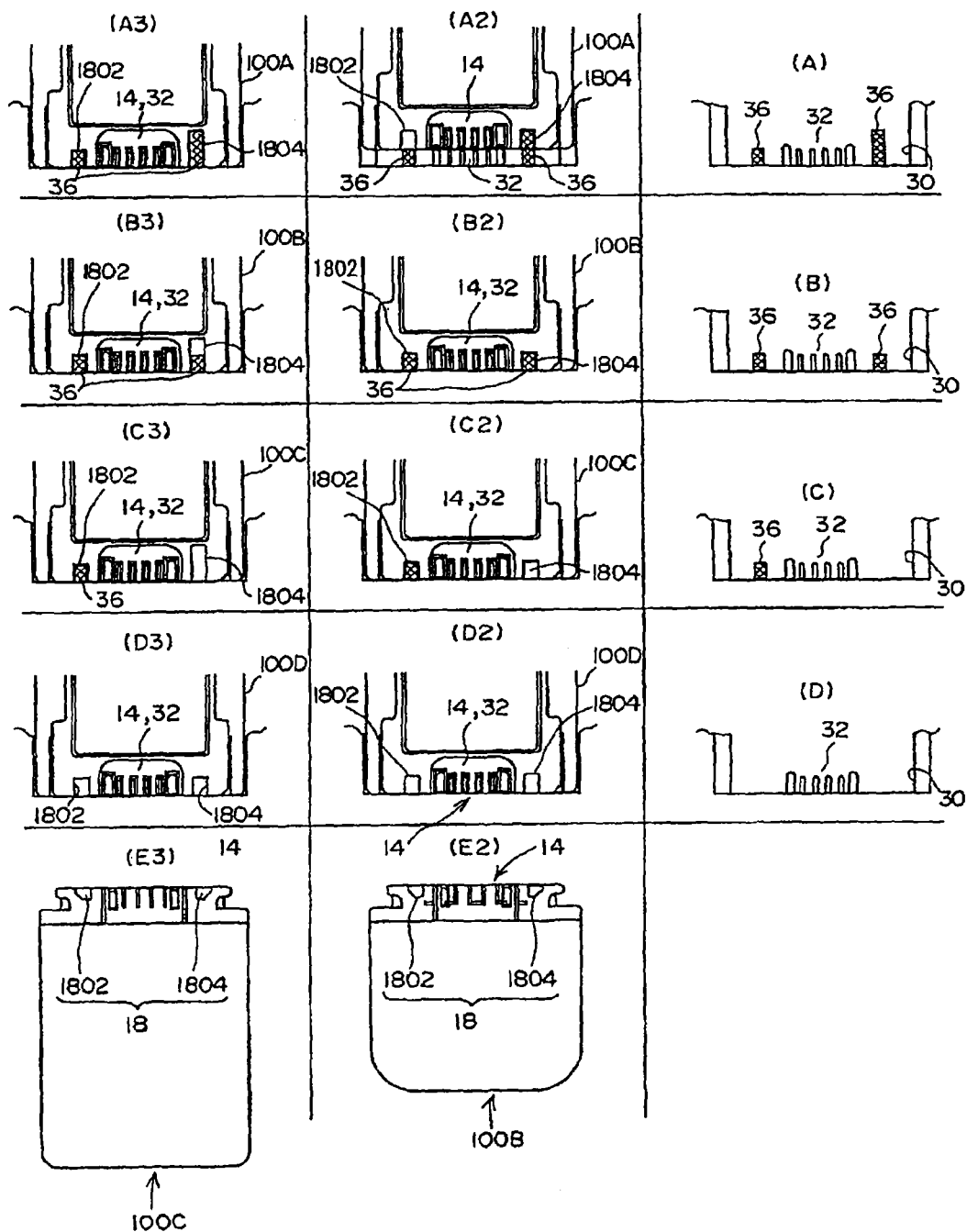
FIG. 16 is an explanatory diagram showing the relationship between the identification recesses 1802, 1804 of the identification section 18 of the battery apparatus 100 and the identification projections 36 of the imaging apparatus 200.

FIGS. 15, 16 are explanatory diagrams showing the relationship between the identification recesses 1802, 1804 of the identification section 18 of the battery apparatus 100 and the identification projection 36 of the imaging apparatus 200. Note that FIGS. 15 (A) through (D) and FIGS. 16 (A) through (D) are perspective diagrams of the attachment section-side terminals 32 and the identification projections 36 of battery attachment sections 30. FIGS. 15 (A1) through (D1) and FIGS. 16 (A2) through (D2) are perspective diagrams in which battery apparatus 100 are attached to the battery attachment sections 30. FIGS. 16 (A3) through (D3) are perspective diagrams in which a battery apparatus 100 is attached to the battery attachment sections 30. FIG. 15 (E1), FIG. 16 (E2), FIG. 16 (E3) show side views of the battery apparatus 100. FIG. 15 (E1), FIGS. 16 (E2), (E3) are diagrams of three types of battery apparatus 100 (100A, 100B, 100C), each having a different characteristic from the others. Their widths are equal, but their capacity and thickness increase in the stated order, and the number of identification recesses 1802, 11804 and their lengths differ from one battery apparatus to another.

FIGS. 15 (A), (B), (C), (D), FIGS. 16 (A), (B), (C), (D) are diagrams respectively showing portions of four types of battery attachment sections 30 of the imaging apparatus 200 to which the battery apparatus 100 are attached. Each of these four types of battery attachment sections 30 permits attachment of a different type of battery apparatus 100, and its identification projection(s) 36 differs in number and height.

And FIGS. 15 (A1), (B1), (C1), (D1) show states in which the battery apparatus 100A is attached to the four types of battery attachment sections 30. FIGS. 16 (A2), (B2), (C2), (D2) show states in which the battery apparatus 100B is attached to the four types of battery attachment sections 30. FIGS. 16 (A3), (B3), (C3), (D3) show states in which the battery apparatus 100C is attached to the four types of battery attachment sections 30.

As shown in FIGS. 15 (A), (B), (C), (D), FIGS. 16 (A), (B), (C), (D), one of the battery attachment sections 30 is provided with only one identification projection 36 on one side of its attachment section-side terminal 32, and other battery attachment sections 30 are provided with a total of two identification projections 36 on both sides of their attachment section-side terminal 32. As to the two identification projections 36, there are variations in their length from one battery attachment section 30 to another, such as two long identification projections 36 of the same length, two short identification projections 30 of the same length, or two identification projections 30 each having a different length.

Therefore, as to, e.g., a battery attachment section 30A, one of the two identification projections 36, 36 is formed to be large in length, and the other identification projection 36 is formed to be short in length.

Further, as shown in FIG. 15 (A1), FIGS. 16 (A2), (A3), in one of the battery apparatus 100, one of the two identification recesses is closed, and in other battery apparatus 100, both of the two identification recesses 1802, 1804 are open. As to the two identification recesses, there are variations in their length from one battery apparatus 100 to another, such as two long identification recesses 1802, 1804 of the same length, two short identification recesses 1802, 1804 of the same length, or two identification recesses 1802, 1804 each having a different length.

Therefore, as to, e.g., the battery apparatus 100A, one of the two identification recesses, i.e., the identification recess 1802, is short, and the other identification recess 1804 is closed.

Thus, in the case of the battery apparatus 100A, as in FIGS. 15 (A1), (B1), if the identification projection 36 is positioned at a location corresponding to the identification recess 1804 which is closed, attachment of the battery apparatus 100A is prohibited. On the other hand, as shown in FIG. 15 (C1), when the identification projection 36 is provided so as to correspond to the identification recess 1802 which is open, and when the length of the identification projection 36 is equal to or smaller than the identification recess 1802, attachment of the battery apparatus 100A is permitted. Further, as shown in FIG. 15 (D1), even if no identification projection 36 is provided at a location corresponding to the identification recess 1802 which is open, attachment of the battery apparatus 100A is permitted.

Furthermore, in the case of the battery apparatus 100B, 100C, similarly to the case of the battery apparatus 100A, types of imaging apparatus 200 which permit their attachment are determined according to combinations of the lengths of the identification recesses 1802, 1804, the length of the identification projection(s) 36, and the presence/absence of the identification projection(s) 36.

Embodiment 2

Next, Embodiment 2 of the present invention will be described with reference to the drawings.

Embodiment 2 differs from Embodiment 1 in that the electronic equipment is a battery charger and that detection means for detecting the identification section 18 of the battery apparatus 100 is provided.

Figure 17:
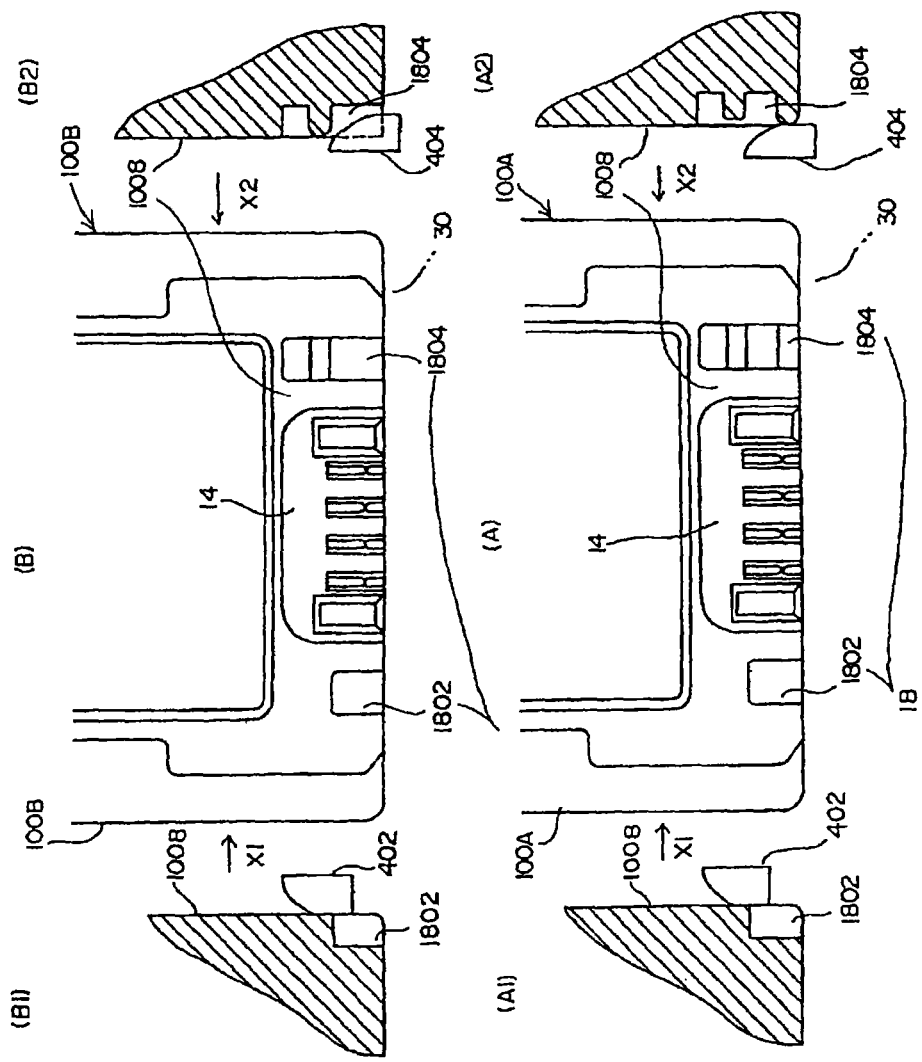
FIG. 17 is an explanatory diagram showing states in which four types of battery apparatus 100 (100A, 100B, 100C, 100D), each having a different capacity, charging current value for supply during charge, or the like, are attached to a battery charger 400 as electronic equipment.
Figure 18:
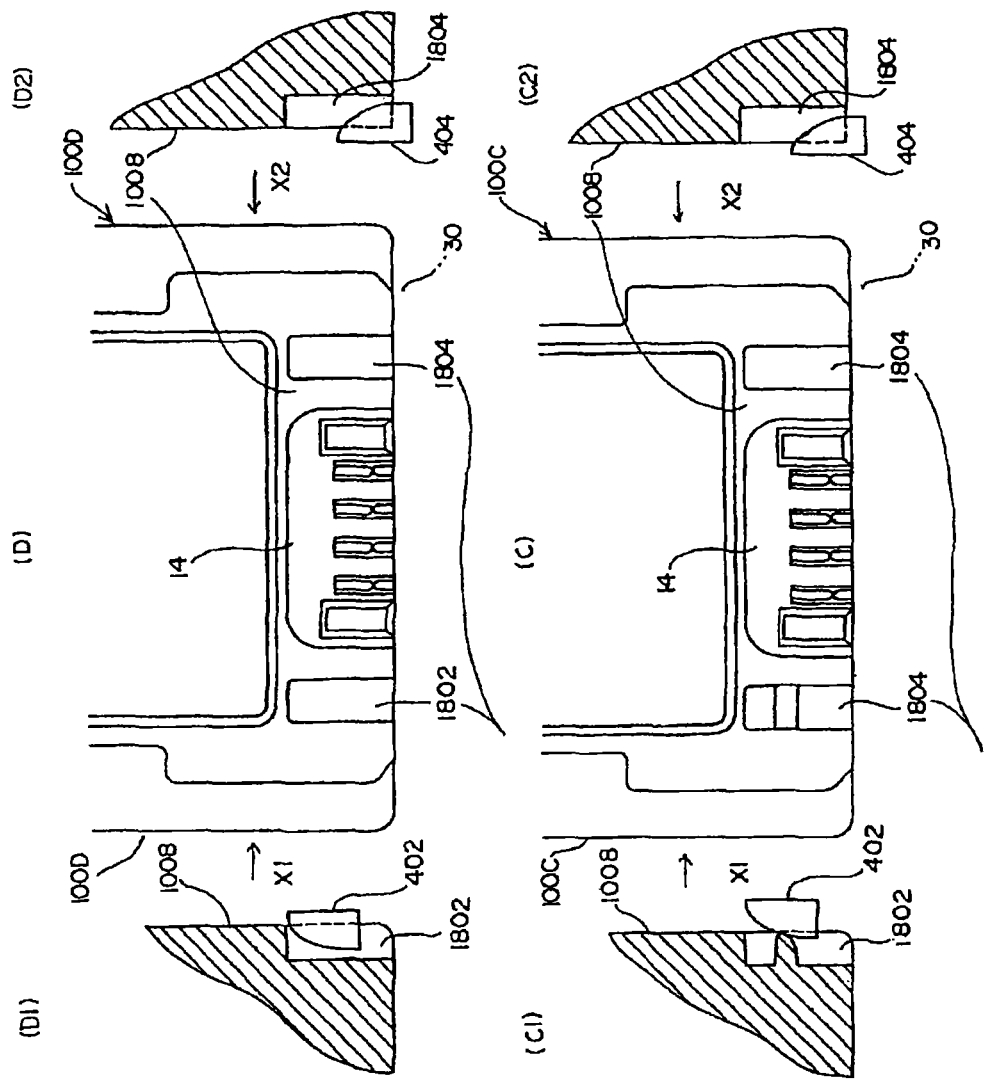
FIG. 18 is an explanatory diagram showing states in which four types of battery apparatus 100 (100A, 100B, 100C, 100D), each having a different capacity, charging current value for supply during charge, or the like, are attached to the battery charger 400 as the electronic equipment.

FIGS. 17, 18 are explanatory diagrams showing states in which four types of battery apparatus 100 (100A, 100B, 100C, 100D), each having a different capacity or charging current for supply during charge, are attached to a battery charger 400.

Figure 19:
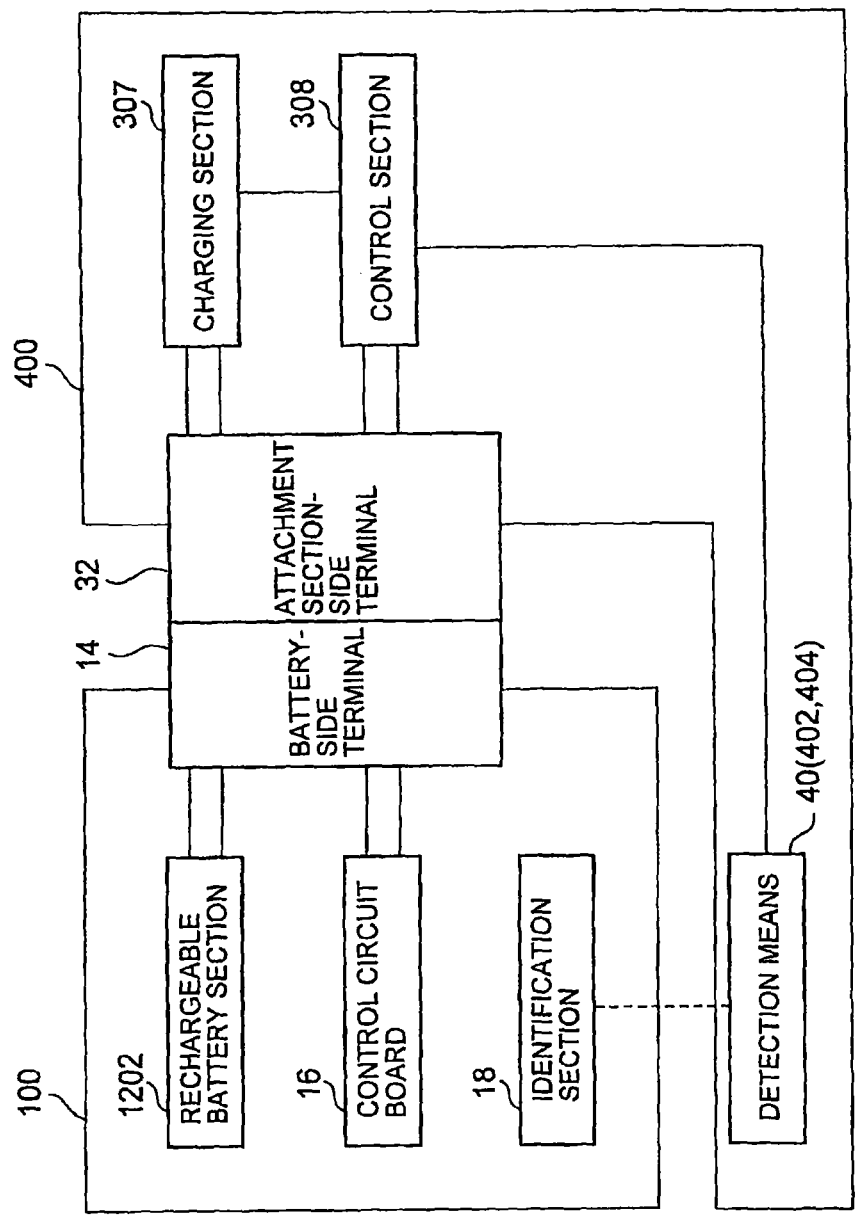
FIG. 19 is a block diagram showing a configuration of the battery apparatus 100 and the battery charger 400.

FIG. 19 is a block diagram showing a configuration of the battery apparatus 100, and the battery charger 400 as the electronic equipment. In the following, the same or similar parts as in Embodiment 1 are denoted by the same reference symbols, and their descriptions are omitted.

Note that FIGS. 17 (A), (B), and FIGS. 18 (C), (D) are perspective diagrams of battery-side terminals 14. FIGS. 17 (A1), (B1) are views on arrow X1 of FIGS. 17 (A), (B) with the battery apparatus attached to a battery attachment section of the battery charger 400. FIGS. 17 (A2), (B2) are views on arrow X2 of FIGS. 17 (A), (B) with the battery apparatus attached to the battery attachment section of the above-mentioned battery charger. FIGS. 18 (C1), (D1) are diagrams as viewed in the direction of an arrow X1 of FIGS. 18 (C), (D) with the battery apparatus attached to the battery attachment section of the battery charger. FIGS. 18 (C2), (D2) are views on arrow X2 of FIGS. 18 (A), (B) with the battery apparatus attached to the battery attachment section of the above-mentioned battery charger.

In the battery attachment section 30 (FIGS. 17, 18) of the battery charger 400, there are provided an attachment section-side terminal (not shown) and detection means 40 (FIG. 19). The attachment section-side terminal connects to the battery-side terminal 14 with the battery apparatus 100 attached to the battery attachment section. The detection means 40 serves to detect at least one of the positions, cross-sectional shapes, and lengths of the identification recesses 1802, 1804.

In the present embodiment, as the detection means 40, sensors 402, 404 (FIGS. 17, 18) formed from microswitches or the like are provided at locations of the battery attachment section 30 which face the two identification recesses 1802, 1804, respectively.

Of the two sensors 402, 404, the sensor 402 is provided at such a position as to be pressed by a case 10 portion which forms the identification section 18 if one of the identification recesses, i.e., the identification recess 1802 is short, and not to be pressed by the case 10 portion which forms the identification section 18 if the identification recess 1802 is long. Therefore, the sensor 402 is configured to detect the length of the identification recess 1802, whether it is long or short, and supply the detection result to a control section 308.

The other one of the two sensors 402, 404, i.e., the sensor 404 is provided at such a position as to be pressed by a case 10 portion which forms the identification section 18 if the other identification recess 1804 is absent, and not to be pressed by the case 10 portion which forms the identification section 18 if the identification recess 1804 is present. Therefore, the sensor 404 is configured to detect the presence/absence of the identification recess 1804, and supply the detection result to the control section 308.

Further, as shown in FIGS. 17 (A), (B), FIGS. 18 (C), (D), similarly to the case of Embodiment 1, in some of the battery apparatus 100, one of the two identification recesses is closed, and in other battery apparatus 100, both of the two identification recesses 1802, 1804 are open. As to the two identification recesses, there are variations in their length from one battery apparatus to another, such as two long identification recesses 1802, 1804 of the same length, two short identification recesses 1802, 1804 of the same length, or two identification recesses 1802, 1804 each having a different length.

Therefore, as to, e.g., the battery apparatus 100A, one of the two identification recesses, i.e., the identification recess 1802 is short, and the other identification recess 1804 is closed.

As shown in FIG. 19, the battery apparatus 100 has the battery-side terminal 14, a rechargeable battery section 12, the control circuit board 16, the identification section 18.

The battery charger 400 has the attachment section-side terminal 32, the detection means 40, a charging section 307, the control section 308.

The charging section 306 is configured to supply a charging current to the charging section 12 of the battery apparatus 100 through the attachment section-side terminal 32 and the battery-side terminal 14, to charge the charging section 12.

The control section 308 is configured to implement data communication with the control circuit board 16 of the battery apparatus 100 through the attachment section-side terminal 32 and the battery-side terminal 14, to receive identification data indicative of a characteristic of the battery apparatus 100 from the control circuit board 16.

Further, the control section 308 is configured to determine the characteristic of the battery apparatus 100 on the basis of a detection result by the detection means 40, to control the above-mentioned charging current according to the detection result. Specifically, it is configured to adjust the above-mentioned charging current value and its supply time by controlling the charging section 306. In the present embodiment, it is configured such that the charging current is adjustable on three levels, i.e., a normal charging current, a quick charging current, and a super quick charging current. Note that the normal charging current, quick charging current, super quick charging current are set such that their current values increase in this order.

Next, advantageous effects of the present embodiment will be described.

When the battery apparatus 100 has been attached to the battery attachment section 30 of the battery charger 400, a detection result as to the presence/absence (cross-sectional shape) of the identification recess(es) 1802, 1804 of the battery apparatus 100 and the length of the identification recess(es) 1802, 1804 of the battery apparatus 100 is supplied by the detection means 40, to the control section 308. As a result, the control section 308 determines the type of the battery apparatus 100 on the basis of the above-mentioned detection result, to control the charging section 306 such that a suitable charging current corresponding to the determined characteristic of the battery apparatus 100 is to be supplied to the rechargeable battery section 1202. Specifically, any of the normal charging current, quick charging current, super quick charging current is set as the charging current.

Therefore, only by attaching the battery apparatus 100 to the battery charger 400, a suitable charging operation which corresponds to the characteristic of the battery apparatus 100 attached can be performed. Thus, since the user has to perform no special operation, this configuration is advantageous in enhancing the usability of the battery charger 400.

By the way, as mentioned above, the control circuit board 16 of the battery apparatus 100 holds identification data indicative of the characteristic of the battery apparatus 100 itself, i.e., the capacity, suitable charging current value, or whether any of the normal charging current, quick charging current, super quick charging current is applicable as the charging current, and can transmit the identification data to the control section 308 of the battery charger 400.

Thus, by performing both determination of the battery apparatus 100 by the detection means 40 and determination of the battery apparatus 100 by the identification data, a suitable charging current can be supplied to the battery apparatus 100 more reliably, as hereinafter described.

Figure 20:
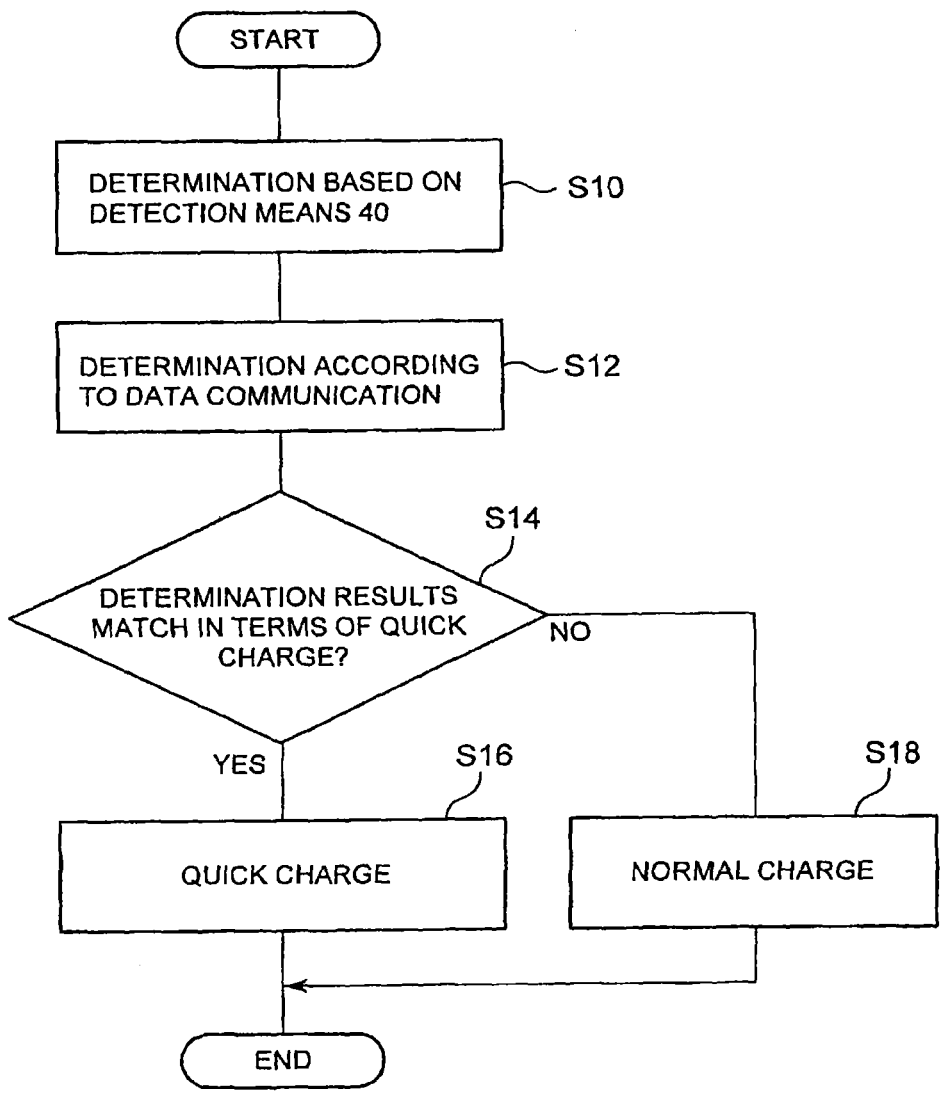
FIG. 20 is a flowchart showing a charging operation in a modified example of Embodiment 2.

FIG. 20 is a flowchart showing a charging operation in a modified example of Embodiment 2.

First, when the battery apparatus 100 has been attached to the battery charger 400, the control section 308 determines the characteristic of the battery apparatus 100 on the basis of a detection result by the detection means 40 (step S10).

Further, the control section 308 receives the above-mentioned identification data on the battery apparatus 100 by implementing data communication with the control circuit board 16 of the battery apparatus 100, to determine the characteristic of the battery apparatus 100 on the basis of the identification data received (step S12).

The control section 308 determines whether or not these two determination results match in terms of the battery apparatus being quickly chargeable (step S14).

If the determination result in step S14 is positive ("Y"), the control section 308 controls the charging section 306 so as to perform a charging operation based on quick charge (step S16). If the determination result in step S14 is negative ("N"), the control section 308 controls the charging section 306 so as to perform a charging operation based on normal charge (step S18).

In this way, a quick charge is implemented only if the determination result by the detection means 40 match the determination result by the above-mentioned identification data. Thus, even if a battery apparatus 100 having the identification section 18 not correctly configured, i.e., a battery apparatus 100 which is not a genuine product, has been attached to the battery charger 400, only a normal charging operation is permitted, prohibiting a quick charging operation in which a charging current greater than in a normal charge is supplied to the battery apparatus 100. Thus, neither the battery apparatus 100 nor the battery charger 400 are unreasonably loaded. Consequently, this configuration is advantageous in implementing a suitable charging operation.

While the two identification recesses 1802, 1804 are provided as the identification section 18 of the battery apparatus 100 in each of the above-mentioned embodiments, one, or three or more identification recesses may be provided. Further, the identification recesses may come in three or more different lengths. Furthermore, while the identification recesses are made different in terms of their presence/absence (cross-sectional shape) and length in each of the above-mentioned embodiments, the identification recesses may be made different otherwise in terms of their position, e.g., their positions in the width direction W of the case 100. In these cases, identification projections on the side of the battery attachment section are, of course, provided so as to correspond to the cross-sectional shapes including the presence/absence of the identification recesses, the lengths of the identification recesses, the positions of the identification recesses.

Furthermore, it can be said that the battery apparatus 100 according to each of the above-mentioned embodiments is configured as follows.

That is, the battery apparatus has the case 10. The case 10 has the two end surfaces 1022, 1032 positioned on both ends in the length direction, and the side surfaces 1006 connecting these two end surfaces 1022, 1032, and the battery-side terminal 1014 is provided so as to face at least one of the end surface 1022, which is one of the two end surfaces 1022, 1032, and the side surfaces 1006 connected to that end surface 1022. In each side surface 1006 is an erroneous insertion prevention groove, which includes the plurality of recessed portions 1010 and which extends in the above-mentioned length direction L. In the length direction L, if it is termed a side of the battery-side terminal 1014 is as being frontward and a side opposite thereto is termed as being rearward, the erroneous insertion prevention groove is open at a portion (front end portion) which is one of both ends thereof in the length direction L and which is near the battery-side terminal 1014, and is closed at a portion (rear end portion) which is opposite thereto. And on each of the above-mentioned erroneous insertion prevention grooves, a single projection 1018 or two or more projections 1018 are formed, which project outward of the case 10. In the case of the plurality of projections 1018, they extend at intervals in the above-mentioned length direction L.

According to such a configuration, as described in FIG. 13, the identification data on the battery apparatus 100 can be indicated by the position of the projection(s) 1018 in the length direction L, the presence/absence of the projection(s) 1018, the number of projections 1018, or the like. In this case, since the projection(s) 1018 projects outward of the case 10, it occupies no space inside the case 10, and thus, this configuration is advantageous in securing a space for accommodating components inside the case 10, or miniaturizing the case 10. Additionally, this configuration is advantageous in improving the degree of freedom in designing the battery apparatus 100.

Further, the battery apparatus 100 of the present embodiments is provided with the above-mentioned erroneous insertion prevention groove along each of the two side surfaces 1006 which interpose the case 10 in the width direction W and which are opposed to each other. In this case, the two erroneous insertion prevention grooves are engaged with projections corresponding thereto, whereby the above-mentioned case can be positioned in the above-mentioned thickness direction H, and thus the above-mentioned erroneous insertion prevention grooves can be made to function as positioning grooves.

According to such a configuration, if a battery accommodating chamber is provided, which accommodates the battery apparatus 100 by having the battery apparatus 100 inserted thereinto in the above-mentioned length direction L, the above-mentioned respective projections are provided within that battery accommodating chamber, and the above-mentioned two erroneous insertion prevention grooves are engaged with these projections, respectively, whereby battery apparatus, each having a dimension different from the above-mentioned thickness H, can be positioned and accommodated within the above-mentioned battery accommodation chamber.

Further, in the battery apparatus 100 of the present embodiments, the plurality of recessed portions 1010 are formed from the plurality of locking pieces 1012 (1012A, 1012B, 1012C), the side surface 1016 portions respectively facing these plurality of locking pieces 1012 (1012A, 1012B, 1012C), and the surface 1014 portions respectively facing these locking pieces 1012 (1012A, 1012B, 1012C). And thus, the above-mentioned erroneous insertion prevention grooves can be formed from these plurality of recesses 1010.

Furthermore, the battery apparatus 100 of the present embodiments is provided with the projections 1018 so as to be connected to the plurality of locking pieces 1012 (1012A, 1012B, 1012C), respectively, and the projections 1018 are respectively connected to the locking pieces 1012 (1012A, 1012B, 1012C) at locations (near the battery-side terminal) which are toward such a direction as to move (slide) the battery apparatus 100 in the above-mentioned length direction L while the battery apparatus 100 is attached to the battery attachment section 30.

According to such a configuration, when these locking pieces 1012 (1012A, 1012B, 1012C) are locked into and unlocked from the plurality of locking hooks 3004 (3004A, 3004B, 3004C), respectively, spaces are provided between the locking piece 1012A and the locking hook 3004A, between the locking piece 1012B and the locking hook 3004B, between the locking piece 1012C and the locking hook 3004C, in the above-mentioned length direction L. As a result, when the plurality of locking pieces 1012 (1012A, 1012B, 1012C) are locked into and unlocked from the plurality of locking hooks 3004 (3004A, 3004B, 3004C), each locking hook is less subject to interference with the corresponding projection 1018, and this configuration is advantageous in attaching and detaching the battery apparatus 100 smoothly.

Furthermore, in each of the embodiments, e.g., an external type has been described, in which the battery apparatus 100 is attached to the outer surface of the case of the electronic equipment, e.g., by the locking hooks 3004 of the battery attachment section 30 being locked with the locking pieces 1012 of the battery apparatus 100.

However, the present invention is not limited to this configuration. The present invention is, of course, applicable even to an incorporated type, in which a battery accommodation chamber is provided, by which the battery apparatus 100 is accommodated in the electronic equipment. That is, the battery accommodating chamber has a width corresponding to the width of the case 10 of the battery apparatus 100, a height corresponding to the thickness of the case 10, a depth corresponding to the length of the case 10, and an accommodation chamber-side terminal (equivalent to the attachment section-side terminal) that comes in contact with the battery-side terminal 14, with the battery apparatus 100 as oriented in the above-mentioned length direction parallelly inserted into the battery accommodating chamber as oriented in the above-mentioned depth direction, and the battery apparatus 100 is attached to the electronic equipment when the battery apparatus has been accommodated in the battery accommodation chamber.

Furthermore, while the examples in which the electronic equipment includes an imaging apparatus and a battery charger has been shown in each of the embodiments, the present invention is, of course, applicable to various electronic equipment that operate using a battery apparatus.

The invention claimed is:

1. A battery comprising:
a case having a bottom surface and a front surface, wherein the front surface is approximately perpendicular to the bottom surface, the bottom surface is one of surfaces of the case in a thickness direction, the front surface is one of surfaces of the case in a length direction;
a terminal portion to output power from a battery cell, the terminal portion located at a corner between the bottom surface and the front surface, and the terminal portion including a negative terminal and a positive terminal arranged in a width direction;
a step provided on the front surface, the step extending in the width direction;
locking pieces projecting from both sides of the bottom surface in the width direction; and
side grooves provided at both sides of the battery in the width direction and extending in the length direction, where the locking pieces hang over the side grooves, wherein
a width of the step in the width direction is smaller than a distance between side surfaces of the side grooves in the width direction.

2. The battery according to claim 1, wherein the step is formed by a projection that projects from the front surface in the length direction.

3. The battery according to claim 1, wherein the step is separated from the negative and positive terminals in the thickness direction.

4. The battery according to claim 1, further comprising:
a plurality of terminal grooves included in the terminal portion and arranged in the width direction, wherein the negative and positive terminals are provided inside respective ones of the terminal grooves, wherein
the width of the step in the width direction is greater than a total width of the plurality of terminal grooves in the width direction.

5. The battery according to claim 1, wherein the step extends linearly in the width direction.

6. The battery according to claim 1, wherein the step is formed on the terminal portion.

7. The battery according to claim 1, further comprising:
a plurality of terminal grooves included in the terminal portion and arranged in the width direction, wherein the negative and positive terminals are provided inside respective ones of the terminal grooves;
a first concave portion provided at a first side of the plurality of terminal grooves in the width direction; and
a second concave portion provided at a second side of the plurality of terminal grooves in the width direction, wherein
the width of the step in the width direction is approximately equal to a distance between the first and second concave portions in the width direction.

8. The battery according to claim 1, further comprising:
a plurality of terminal grooves included in the terminal portion and arranged in the width direction, wherein the negative and positive terminals are provided inside respective ones of the terminal grooves;
a first recess provided at a first side of the plurality of terminal grooves in the width direction; and
a second recess provided at a second side of the plurality of terminal grooves in the width direction, wherein
the width of the step in the width direction is smaller than a distance between the first and second recesses in the width direction.

9. The battery according to claim 8, wherein the recesses are for an identification section.

10. The battery according to claim 8, wherein the recesses are for identifying a characteristic of the battery.

11. The battery according to claim 1, wherein the step is formed so as to step up from the front surface in the length direction.

12. The battery according to claim 1, wherein the terminal portion includes a terminal case, a plurality of grooves, and contact pieces including the negative terminal and positive terminal.

13. The battery according to claim 1, wherein the step fits into a recess provided in an apparatus to which the battery is attached.

14. The battery according to claim 1, wherein the step forms a stepped surface, and the stepped surface is an outermost surface of the battery in the length direction.

15. The battery according to claim 1, wherein the battery has a body section and a bottom section, and the step is located at the body section.

16. The battery according to claim 15, wherein the step is located at an approximately same position in the thickness direction as a plane that separates the body section and the bottom section.

17. The battery according to claim 1, wherein
the case comprises a first segment and a second segment;
the case is formed by bonding the first and second segments together along a bonding surface; and
the step is positioned between the bonding surface and the bottom surface in the thickness direction.

18. The battery according to claim 1, wherein the battery is to be attached to a battery attachment section of an imaging apparatus.

19. The battery according to claim 1, wherein the battery is to supply power to an imaging apparatus.

20. The battery according to claim 1, wherein the step is located at an approximately same plane in the thickness direction as bottom surfaces of the side grooves, which are parallel to the bottom surface.

21. The battery according to claim 1, wherein a first set of three pieces of the locking pieces project from one side of the bottom surface in the width direction and a second set of three pieces of the locking pieces project from the other side of the bottom surface in the width direction.

22. The battery according to claim 1, wherein the side grooves extend in the length direction to the front surface such that both sides of the battery in the width direction on the front surface are recessed.

23. The battery according to claim 22, wherein the side grooves are configured to slidably attach the front surface of the battery to an imaging apparatus.

24. The battery according to claim 1, wherein the locking pieces are to engage with corresponding locking hooks of an imaging apparatus.

* * * * *